US008855107B1

(12) United States Patent
Kirchhoff et al.

(10) Patent No.: US 8,855,107 B1
(45) Date of Patent: Oct. 7, 2014

(54) METHODS AND SYSTEMS FOR CALL ROUTING VIA A TELEPHONE NUMBER

(75) Inventors: Leland W. Kirchhoff, Santa Barbara, CA (US); David S. Trandal, Santa Barbara, CA (US); Colin Kelley, Santa Barbara, CA (US)

(73) Assignee: Callwave Communications, LLC, Brookline, MA (US)

( * ) Notice: Subject to any disclaimer, the term of this patent is extended or adjusted under 35 U.S.C. 154(b) by 134 days.

(21) Appl. No.: 13/353,278

(22) Filed: Jan. 18, 2012

Related U.S. Application Data

(63) Continuation of application No. 11/480,277, filed on Jun. 30, 2006, now abandoned.

(60) Provisional application No. 60/696,135, filed on Jul. 1, 2005, provisional application No. 60/752,521, filed on Dec. 20, 2005.

(51) Int. Cl.
*H04M 1/56* (2006.01)

(52) U.S. Cl.
USPC .......................................................... 370/352

(58) Field of Classification Search
None
See application file for complete search history.

(56) References Cited

U.S. PATENT DOCUMENTS

| 3,936,613 A | 2/1976 | Nishigori et al. |
| 3,956,595 A | 5/1976 | Sobanski |
| 4,009,337 A | 2/1977 | Sakai et al. |
| 4,022,983 A | 5/1977 | Braun et al. |
| 4,485,470 A | 11/1984 | Reali |
| 4,736,405 A | 4/1988 | Akiyama |
| 4,809,321 A | 2/1989 | Morganstein et al. |
| 4,893,336 A | 1/1990 | Wuthnow |
| 4,994,926 A | 2/1991 | Gordon et al. |
| 5,040,208 A | 8/1991 | Jolissaint |
| 5,046,087 A | 9/1991 | Sakai |
| 5,291,302 A | 3/1994 | Gordon et al. |
| 5,404,537 A | 4/1995 | Olnowich et al. |
| 5,434,908 A | 7/1995 | Klein |
| 5,459,584 A | 10/1995 | Gordon et al. |
| 5,467,388 A | 11/1995 | Redd, Jr. et al. |
| 5,526,524 A | 6/1996 | Madduri |
| 5,533,102 A | 7/1996 | Robinson et al. |
| 5,533,106 A | 7/1996 | Blumhardt |

(Continued)

FOREIGN PATENT DOCUMENTS

| CA | 1329852 | 9/1989 |
| EP | 1 120 954 | 8/2001 |

(Continued)

OTHER PUBLICATIONS

U.S. Appl. No. 11/433,061, filed May 12, 2006, Trandal et al.

(Continued)

*Primary Examiner* — Hassan Phillips
*Assistant Examiner* — Omeed D Rahgozar
(74) *Attorney, Agent, or Firm* — Knobbe, Martens, Olson & Bear LLP

(57) ABSTRACT

The present invention relates generally to telecommunications and in particular to systems and methods for routing telephone calls. By way of example, a first address, such as a first phone number, can be associated with a telephonic terminal, such as a mobile phone. Incoming calls to the first address can be routed to the telephonic terminal or to other destinations based on telephonic terminal status.

20 Claims, 12 Drawing Sheets

(56) References Cited

U.S. PATENT DOCUMENTS

| | | |
|---|---|---|
| 5,577,111 A | 11/1996 | Iida et al. |
| 5,583,918 A | 12/1996 | Nakagawa |
| 5,619,557 A | 4/1997 | Van Berkum |
| 5,640,677 A | 6/1997 | Karlsson |
| 5,651,054 A | 7/1997 | Dunn et al. |
| 5,668,861 A | 9/1997 | Watts |
| 5,751,795 A | 5/1998 | Hassler et al. |
| 5,774,067 A | 6/1998 | Olnowich et al. |
| 5,805,587 A | 9/1998 | Norris et al. |
| 5,809,128 A | 9/1998 | McMullin |
| 5,812,551 A | 9/1998 | Tsukazoe et al. |
| 5,825,867 A | 10/1998 | Epler et al. |
| 5,832,060 A | 11/1998 | Corlett et al. |
| 5,835,573 A | 11/1998 | Dee et al. |
| 5,862,208 A | 1/1999 | MeLampy et al. |
| 5,870,459 A | 2/1999 | Phillips et al. |
| 5,894,504 A | 4/1999 | Alfred et al. |
| 5,894,595 A | 4/1999 | Foladare et al. |
| 5,946,386 A | 8/1999 | Rogers et al. |
| 5,960,064 A | 9/1999 | Foladare et al. |
| 5,960,073 A | 9/1999 | Kikinis et al. |
| 5,963,629 A | 10/1999 | Jung |
| 5,966,435 A | 10/1999 | Pino |
| 5,995,594 A | 11/1999 | Shaffer et al. |
| 5,995,603 A | 11/1999 | Anderson |
| 6,014,436 A | 1/2000 | Florence et al. |
| 6,031,896 A | 2/2000 | Gardell et al. |
| 6,032,051 A | 2/2000 | Hall et al. |
| 6,034,956 A | 3/2000 | Olnowich et al. |
| 6,035,031 A | 3/2000 | Silverman |
| 6,038,291 A | 3/2000 | Cannon et al. |
| 6,041,103 A | 3/2000 | La Porta et al. |
| 6,044,059 A | 3/2000 | Olnowich |
| 6,078,581 A | 6/2000 | Shtivelman et al. |
| 6,100,873 A | 8/2000 | Bayless et al. |
| 6,104,800 A | 8/2000 | Benson |
| 6,134,315 A | 10/2000 | Galvin |
| 6,144,644 A | 11/2000 | Bajzath et al. |
| 6,160,881 A | 12/2000 | Beyda et al. |
| 6,167,127 A | 12/2000 | Smith et al. |
| 6,169,795 B1 | 1/2001 | Dunn et al. |
| 6,169,796 B1 | 1/2001 | Bauer et al. |
| 6,175,622 B1 | 1/2001 | Chiniwala et al. |
| 6,178,183 B1 | 1/2001 | Buskirk, Jr. |
| 6,181,691 B1 | 1/2001 | Markgraf et al. |
| 6,208,638 B1 | 3/2001 | Rieley et al. |
| 6,212,261 B1 | 4/2001 | Meubus et al. |
| 6,230,009 B1 | 5/2001 | Holmes et al. |
| 6,243,378 B1 | 6/2001 | Olnowich |
| 6,246,872 B1 | 6/2001 | Lee et al. |
| 6,253,249 B1 | 6/2001 | Belzile |
| 6,266,400 B1 | 7/2001 | Castagna |
| 6,278,704 B1 | 8/2001 | Creamer et al. |
| 6,292,478 B1 | 9/2001 | Farris |
| 6,304,565 B1 | 10/2001 | Ramamurthy |
| 6,310,939 B1 | 10/2001 | Varney |
| 6,337,898 B1 | 1/2002 | Gordon |
| 6,350,066 B1 | 2/2002 | Bobo, II |
| 6,353,660 B1 | 3/2002 | Burger et al. |
| 6,353,663 B1 | 3/2002 | Stevens et al. |
| 6,363,414 B1 | 3/2002 | Nicholls et al. |
| 6,374,102 B1 | 4/2002 | Brachman et al. |
| 6,381,459 B1 | 4/2002 | Gervens et al. |
| 6,405,035 B1 | 6/2002 | Singh |
| 6,411,601 B1 | 6/2002 | Shaffer et al. |
| 6,411,692 B1 | 6/2002 | Scherer |
| 6,411,805 B1 | 6/2002 | Becker et al. |
| 6,438,216 B1 | 8/2002 | Aktas |
| 6,438,222 B1 | 8/2002 | Burg |
| 6,477,246 B1 | 11/2002 | Dolan et al. |
| 6,496,569 B2 | 12/2002 | Pelletier et al. |
| 6,496,576 B2 | 12/2002 | Tanaka et al. |
| 6,501,750 B1 | 12/2002 | Shaffer et al. |
| 6,505,163 B1 | 1/2003 | Zhang et al. |
| 6,510,162 B1 | 1/2003 | Fijolek et al. |
| 6,510,417 B1 | 1/2003 | Woods et al. |
| 6,512,930 B2 | 1/2003 | Sandegren |
| 6,519,258 B1 | 2/2003 | Tsukazoe et al. |
| 6,529,587 B1 | 3/2003 | Cannon et al. |
| 6,539,084 B1 | 3/2003 | Long |
| 6,542,596 B1 | 4/2003 | Hill et al. |
| 6,545,589 B1 | 4/2003 | Fuller et al. |
| 6,546,087 B2 | 4/2003 | Shaffer et al. |
| 6,549,612 B2 | 4/2003 | Gifford et al. |
| 6,553,222 B1 | 4/2003 | Weiss |
| 6,564,264 B1 | 5/2003 | Creswell et al. |
| 6,564,321 B2 | 5/2003 | Bobo, II |
| 6,567,505 B1 | 5/2003 | Omori et al. |
| 6,574,319 B2 | 6/2003 | Latter et al. |
| 6,621,892 B1 | 9/2003 | Banister et al. |
| 6,643,034 B1 | 11/2003 | Gordon et al. |
| 6,658,100 B1 | 12/2003 | Lund |
| 6,661,785 B1 | 12/2003 | Zhang et al. |
| 6,661,886 B1 | 12/2003 | Huart et al. |
| 6,662,232 B1 | 12/2003 | Nicholls et al. |
| 6,687,362 B1 | 2/2004 | Lindquist et al. |
| 6,690,785 B1 | 2/2004 | Stelter et al. |
| 6,697,478 B1 | 2/2004 | Meldrum et al. |
| 6,721,408 B1 | 4/2004 | Bain et al. |
| 6,738,461 B2 | 5/2004 | Trandal et al. |
| 6,748,058 B1 | 6/2004 | Schwend et al. |
| 6,751,299 B1 | 6/2004 | Brown et al. |
| 6,775,370 B2 | 8/2004 | Burg |
| 6,782,088 B1 | 8/2004 | Gabara |
| 6,785,021 B1 | 8/2004 | Gordon et al. |
| 6,792,082 B1 | 9/2004 | Levine |
| 6,792,094 B1 | 9/2004 | Kirkpatrick |
| 6,813,498 B1 | 11/2004 | Durga et al. |
| 6,857,074 B2 | 2/2005 | Bobo, II |
| 6,879,677 B2 | 4/2005 | Trandal et al. |
| 6,898,275 B2 | 5/2005 | Dolan et al. |
| 6,968,174 B1 | 11/2005 | Trandal et al. |
| 6,999,572 B1 | 2/2006 | Shaffer et al. |
| 6,999,576 B2 | 2/2006 | Sacra |
| 7,003,087 B2 | 2/2006 | Spencer et al. |
| 7,006,455 B1 | 2/2006 | Fandrianto et al. |
| 7,103,167 B2 | 9/2006 | Brahm et al. |
| 7,120,455 B1 | 10/2006 | Chen et al. |
| 7,209,964 B2 | 4/2007 | Dugan et al. |
| 7,231,029 B1 | 6/2007 | Kirkpatrick |
| 7,251,317 B1 | 7/2007 | Robbins et al. |
| 7,254,219 B1 | 8/2007 | Hansen et al. |
| 7,266,185 B2 | 9/2007 | Trandal et al. |
| 7,292,841 B2 | 11/2007 | Trandal et al. |
| 7,308,081 B2 | 12/2007 | Trandal et al. |
| 7,382,773 B2 | 6/2008 | Schoeneberger et al. |
| 7,388,949 B2 | 6/2008 | Contractor et al. |
| 7,397,910 B2 | 7/2008 | Dolan et al. |
| 7,409,048 B2 | 8/2008 | Trandal et al. |
| 7,412,050 B2 | 8/2008 | Renner et al. |
| 7,460,653 B2 | 12/2008 | Brahm et al. |
| 7,508,927 B1 | 3/2009 | Trandal et al. |
| 7,522,580 B2 | 4/2009 | Miller et al. |
| 7,548,756 B2 | 6/2009 | Velthius et al. |
| 7,555,110 B2 | 6/2009 | Dolan et al. |
| 7,636,428 B2 | 12/2009 | Brahm et al. |
| 7,688,958 B2 | 3/2010 | Dolan et al. |
| 7,742,586 B1 | 6/2010 | Trandal et al. |
| 7,818,734 B2 | 10/2010 | Giannini et al. |
| 7,822,188 B1 | 10/2010 | Kirchhoff et al. |
| 7,839,987 B1 | 11/2010 | Kirchhoff et al. |
| 7,852,749 B2 | 12/2010 | Mickle et al. |
| 7,907,933 B1 | 3/2011 | Trandal et al. |
| 8,064,588 B2 | 11/2011 | Brahm et al. |
| 8,472,604 B2 | 6/2013 | Brahm et al. |
| 2002/0009184 A1 | 1/2002 | Shnier |
| 2002/0010616 A1 | 1/2002 | Itzhaki |
| 2002/0035616 A1 | 3/2002 | Diamond et al. |
| 2002/0085687 A1 | 7/2002 | Contractor et al. |
| 2002/0097710 A1 | 7/2002 | Burg |
| 2003/0003915 A1 | 1/2003 | Foster et al. |
| 2003/0039339 A1 | 2/2003 | Luehrig et al. |
| 2003/0063731 A1 | 4/2003 | Woodring |
| 2003/0108172 A1* | 6/2003 | Petty et al. ............... 379/142.08 |

(56) References Cited

U.S. PATENT DOCUMENTS

| | | | |
|---|---|---|---|
| 2003/0108178 A1* | 6/2003 | Nguyen et al. | 379/220.01 |
| 2003/0123629 A1 | 7/2003 | Hussain et al. | |
| 2003/0128691 A1 | 7/2003 | Bergman et al. | |
| 2003/0156700 A1 | 8/2003 | Brown et al. | |
| 2003/0191823 A1 | 10/2003 | Bansal et al. | |
| 2003/0215078 A1 | 11/2003 | Brahm et al. | |
| 2004/0028203 A1 | 2/2004 | Wurster et al. | |
| 2004/0066926 A1 | 4/2004 | Brockbank et al. | |
| 2004/0073566 A1 | 4/2004 | Trivedi | |
| 2004/0105536 A1 | 6/2004 | Williams | |
| 2004/0141594 A1 | 7/2004 | Brunson et al. | |
| 2004/0141598 A1 | 7/2004 | Moss et al. | |
| 2004/0190706 A1 | 9/2004 | Fleischer, III et al. | |
| 2004/0196867 A1 | 10/2004 | Ejzak et al. | |
| 2004/0235509 A1 | 11/2004 | Burritt et al. | |
| 2004/0240641 A1 | 12/2004 | Cohen et al. | |
| 2004/0247105 A1 | 12/2004 | Mullis et al. | |
| 2004/0248560 A1 | 12/2004 | Bedingfield et al. | |
| 2004/0249650 A1 | 12/2004 | Freedman et al. | |
| 2004/0258220 A1 | 12/2004 | Levine et al. | |
| 2005/0010573 A1 | 1/2005 | Garg | |
| 2005/0053216 A1 | 3/2005 | Spencer et al. | |
| 2005/0063529 A1 | 3/2005 | Meldrum et al. | |
| 2005/0078612 A1 | 4/2005 | Lang | |
| 2005/0083851 A1 | 4/2005 | Fotsch | |
| 2005/0123118 A1 | 6/2005 | Terry et al. | |
| 2005/0152525 A1* | 7/2005 | Kent et al. | 379/207.02 |
| 2005/0154599 A1 | 7/2005 | Kopra et al. | |
| 2005/0186950 A1 | 8/2005 | Jiang | |
| 2005/0201534 A1 | 9/2005 | Ignatin | |
| 2005/0207432 A1* | 9/2005 | Velez-Rivera et al. | 370/401 |
| 2005/0207556 A1 | 9/2005 | Gonzalez et al. | |
| 2005/0265322 A1 | 12/2005 | Hester | |
| 2005/0286498 A1 | 12/2005 | Rand et al. | |
| 2005/0287993 A1 | 12/2005 | Gogic | |
| 2006/0013374 A1 | 1/2006 | Fleischer, III et al. | |
| 2006/0077957 A1* | 4/2006 | Reddy et al. | 370/352 |
| 2006/0227957 A1 | 10/2006 | Dolan et al. | |
| 2006/0268007 A1 | 11/2006 | Gopalakrishnan | |
| 2006/0276193 A1* | 12/2006 | Itzkovitz et al. | 455/445 |
| 2007/0002077 A1 | 1/2007 | Gopalakrishnan | |
| 2007/0067738 A1 | 3/2007 | Flynt et al. | |
| 2007/0153999 A1 | 7/2007 | Daigle | |
| 2007/0160188 A1 | 7/2007 | Sharpe et al. | |
| 2007/0202898 A1 | 8/2007 | Bae et al. | |
| 2009/0100027 A1 | 4/2009 | Malik | |
| 2012/0294303 A1 | 11/2012 | Bossemeyer et al. | |
| 2013/0097664 A1 | 4/2013 | Herz et al. | |

FOREIGN PATENT DOCUMENTS

| | | |
|---|---|---|
| EP | 1120954 | 8/2001 |
| JP | 10-107901 | 4/1998 |
| JP | 10-322462 | 12/1998 |
| JP | 10-322465 | 12/1998 |
| JP | 10-513632 | 12/1998 |
| JP | 11-506292 | 6/1999 |
| JP | 2001-168989 | 6/2001 |
| WO | WO 97/26749 | 7/1997 |
| WO | WO 98-36551 | 8/1998 |
| WO | WO 99-14924 | 3/1999 |
| WO | WO 00 60840 | 10/2000 |
| WO | WO 01/76210 | 10/2001 |

OTHER PUBLICATIONS

U.S. Appl. No. 11/480,277, filed Jun. 30, 2006, Kirchhoff et al.
U.S. Appl. No. 11/697,219, filed Apr. 5, 2007, Trandal et al.
Article: "Widget MySpace Widget"; posted be 4INFO Bob; http://4info.typepad.com/blog/2006/09/widget_myspace_.html; Sep. 15, 2006; 3 pages.
Article: Communications-SMS, Dashboard Widgets—Showcase; http://www.dashboardwidgets.com/showcase/details.php?wid=1082; Oct. 14, 2005; 2 pages.
Communication pursuant to Article 94(3) EPC; EP Application 03731252.7, dated Jun. 3, 2009; 6 pages.
Final Office Action dated Jun. 18, 2010 from U.S. Appl. No. 11/433,061.
International Search Report dated May 19, 2003, PCT/US03/15807.
Johnson, Dave; Article; "Now You're Talking—voice—response systems for home offices—Product Information"; http://www.findarticles.com; Feb. 1999.
Office Action dated Jan. 8, 2010 from U.S. Appl. No. 11/433,061.
Office Action mailed Dec. 22, 2010 from U.S. Appl. No. 11/697,219, in 18 pages.
Supplemental European Search Report, EP Application 03731252.7, dated Jun. 6, 2006.

* cited by examiner

METHODS AND SYSTEMS FOR CALL ROUTING VIA A TELEPHONE NUMBER

PRIORITY CLAIM

This is a continuation of U.S. patent application Ser. No. 11/480,277, filed Jun. 30, 2006 now abandoned, which claims priority from U.S. Patent Application No. 60/696,135, filed Jul. 1, 2005, and U.S. Patent Application No. 60/752,521, filed Dec. 20, 2005, the contents of which are incorporated herein by reference in its entirety.

BACKGROUND OF THE INVENTION

1. Field of the Invention

The present invention relates generally to telecommunications and in particular to systems and methods for routing telephone calls.

2. Description of the Related Art

People are increasingly associated with more phone numbers and phone types. For example, a person may be associated with a cell phone number, a work phone number, a home phone number, and a Voice Over IP (VoIP) phone number. It has thus become more difficult for a caller attempting to reach someone to decide which phone number to call.

SUMMARY OF THE INVENTION

The present invention relates generally to telecommunications and in particular to systems and methods for routing telephone calls.

By way of example, a first address, such as a first phone number, can be associated with a telephonic terminal, such as a mobile phone. Incoming calls to the first address can be routed to the telephonic terminal or to other destinations based on telephonic terminal status. Outgoing calls from that telephonic terminal optionally have the first address as the associated caller ID. Similarly, messages, such as Short Messaging Service (SMS) messages, can be routed to the first address. Optionally, the first address has the standard behavior associated with a mobile phone number, but is associated with additional call handling features offered by a service provider, such as call screening, call transfer, call conferencing, and/or distinctive ring-back.

A method of processing calls, the method comprising: receiving over a network at a call processing system a first call from a calling party directed to a called party's phone address, wherein signaling information associated with the first call includes the calling party's phone address; querying a wireless network system for status of a wireless telephonic destination associated with the called party's phone address; receiving status for the wireless telephonic destination; originating a second call from the call processing system to the wireless telephonic destination associated with the called party; transmitting, while the first call is in progress, a call alert notification regarding the first call, including at least a portion of the signaling information, to a networked computer associated with the called party via a communication channel; bridging the first call with the second call and the communication channel associated with the networked computer; providing a greeting to the calling party via the call processing system; receiving a voice communication from the calling party at the processing system; streaming at least a first portion of the voice communication via the call processing system in substantially real time to the telephonic device and/or the networked computer while ensuring that sound does not travel back to the calling party from the telephonic device or networked computer associated with the called party to thereby allow the called party to screen the caller call from the telephonic device or networked computer while the calling party is unaware that the call screening is being performed; providing a first user interface via the telephonic device or networked computer that when a first input is provided by the called party, causes duplex communication to be provided to the telephonic device or networked computer so that the called party can converse with the calling party; and providing a second user interface via the telephonic device or networked computer that, when a second input is provided by the called party, causes a third call to be originated from the call processing system to one of another telephonic device or networked computer.

Another example embodiment provides a method of processing calls, the method comprising: receiving over a network at a call processing system a first call from a caller directed to a phone address of the called party, wherein signaling information associated with the first call includes the phone address of the caller; querying a wireless network system for the status and phone address of a wireless telephonic destination associated with the called party phone address; originating a second call from the call processing system to a wireless telephonic destination associated with the called party, wherein signaling information associated with the second call includes an identifier associated with the caller so that the second call appears to be originating from the caller; and bridging the first call with the second call.

Another example embodiment provides a method of processing calls, the method comprising: receiving over a network at a call processing system a first call from a caller directed to a called party's phone address, wherein signaling information associated with the first call includes the caller's phone address; querying a wireless network system for the status and phone address of a wireless telephonic destination associated with the called party's phone address; originating a second call from the call processing system to a wireless telephonic destination associated with the called party; transmitting, while the first call is in progress, a call alert notification of the first call including at least a portion of the signaling information to the networked computer associated with the called party; and bridging the first call with the second call.

Another example embodiment provides a method of processing calls, the method comprising: receiving over a network at a call processing system a first call from a caller directed to a called party's phone address; querying a wireless network system for the status and phone address of a wireless telephonic destination associated with the called party's phone address; providing a greeting to the caller via the call processing system; receiving a voice communication from the caller at the processing system; streaming at least a first portion of the voice communication via the call processing system in substantially real time to a telephonic device associated with the called party while ensuring that sound does not travel back to the caller from the telephonic device to thereby allow the called party to screen the call from the telephonic device while the caller is unaware that their call is being screened; and, providing a first user interface via the telephonic device, wherein the called party provides a first input, full duplex communication is provided to the telephonic device.

Another example embodiment provides a method of processing calls, the method comprising: receiving over a network at a call processing system a first call from a caller directed to a called party's phone address, wherein signaling information associated with the first call includes the caller's phone address; querying a wireless network system for the status and phone address of a wireless telephonic destination associated with the called party's phone address; originating a second call from the call processing system to a wireless telephonic destination associated with the called party; providing a greeting to the caller via the call processing system; receiving a voice communication from the caller at the processing system; streaming at least a first portion of the voice communication via the call processing system in substantially real time to a destination associated with the called party while ensuring that sound does not travel back to the caller from the telephonic device associated with the called party to thereby allow the called party to screen the call from the telephonic device while the caller is unaware that their call is being screened; providing a first user interface via the telephonic device that when a first input is provided by the called party, causes duplex communication to be provided to the telephonic device from which the first input was provided so that the called party can converse with the caller; and providing a second user interface via the telephonic device that when a second input is provided by the called party, causes a third call to be originated from the call processing system to another destination.

BRIEF DESCRIPTION OF THE DRAWINGS

Embodiments of the present invention will now be described with reference to the drawings summarized below. These drawings and the associated description are provided to illustrate example embodiments of the invention, and not to limit the scope of the invention.

Throughout the drawings, like reference numbers are used to refer to items that are identical or functionally similar.

DETAILED DESCRIPTION OF PREFERRED EMBODIMENTS

Figure 1:
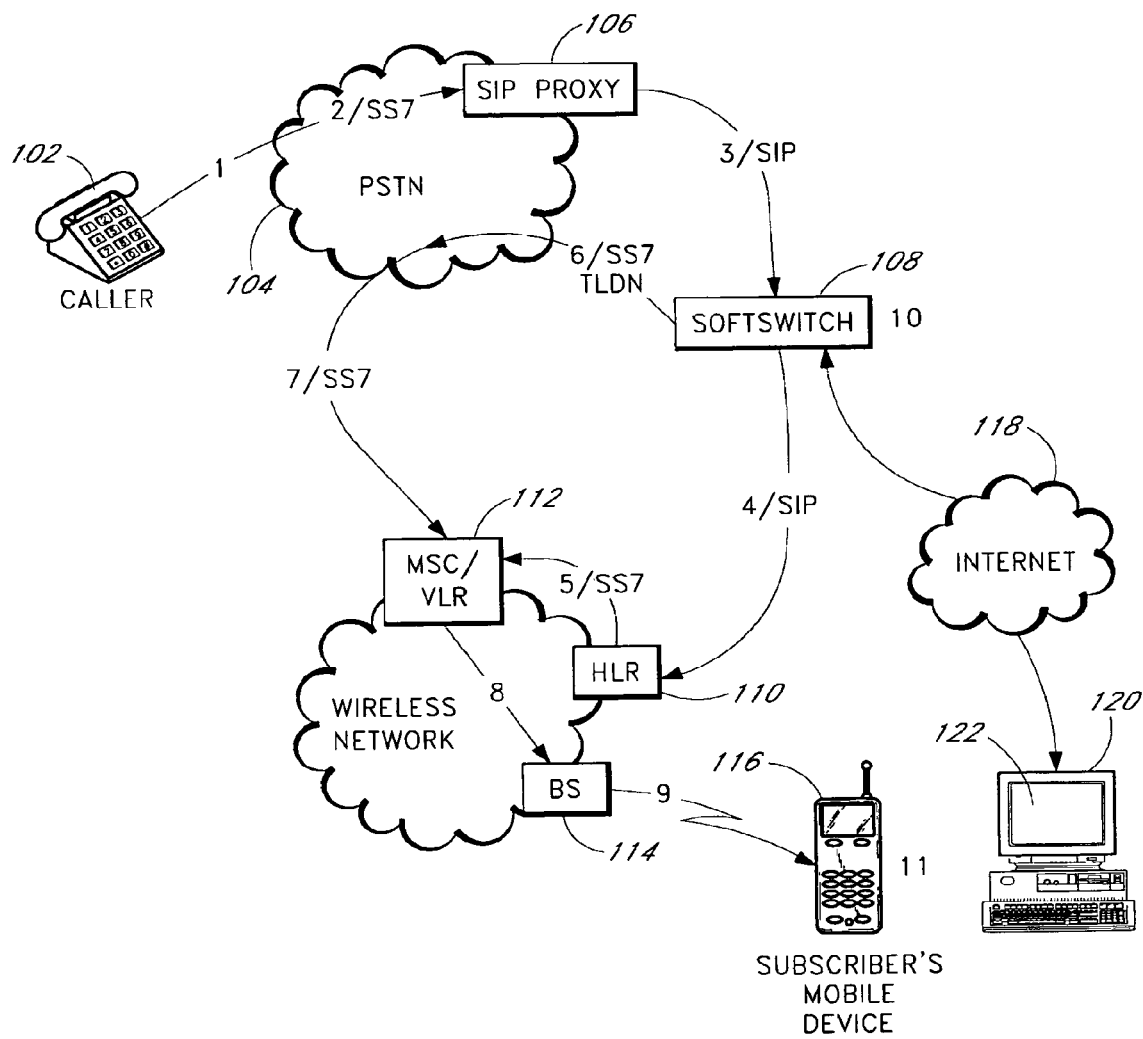
FIG. 1 illustrates an example telecommunications system and an example call handling sequence.

Embodiments described herein enable the provisioning of enhanced call processing services for calls directed to or from a phone address, such as a phone address associated with a mobile telecommunications device, such as a cell phone.

Throughout the following description, the term "Web site" is used to refer to a user-accessible network site that implements the basic World Wide Web standards for the coding and transmission of hypertextual documents. These standards currently include HTML (the Hypertext Markup Language) and HTTP (the Hypertext Transfer Protocol). It should be understood that the term "site" is not intended to imply a single geographic location, as a Web or other network site can, for example, include multiple geographically distributed computer systems that are appropriately linked together. Furthermore, while the following description relates to an embodiment utilizing the Internet and related protocols, other networks, such as networked interactive televisions, and other protocols may be used as well. In addition, unless otherwise indicated, the functions described herein are preferably performed by executable code and instructions running on one or more general-purpose computers. However, the present invention can also be implemented using special purpose computers, state machines, and/or hardwired electronic circuits.

With respect to the example processes disclosed herein, not all states need to be reached, and the states do not necessarily need to be performed in the same order as that illustrated. Unless otherwise specified, the term phone number refers generally to a telephonic address, such as, without limitation, a standard POTs telephone number, an E.164 phone number (ITU-T recommendation which defines the international public telecommunication numbering plan and telephone format used in the PSTN and certain data networks), or a VoIP address.

The following is a glossary for certain abbreviations used herein:
BS—Base Station
HLR—Home Location Register
LNP—Local Number Portability
MSC—Mobile Switching Center
MVNE—Mobile Virtual Network Enabler
MVNO—Mobile Virtual Network Operator
SIM—Subscriber Identity Module
SIP—Session Initiation Protocol
TLDN—Temporary Local Directory Number
VLR—Visitor Location Register Optionally, the VoIP processes described herein are performed using the H.323 standardized protocol established by the International Telecommunications Union (ITU). Advantageously, H.323 provides specifications for real-time, interactive videoconferencing, data sharing and audio applications such as IP telephony. The Session Initiation Protocol (SIP), established by the Internet Engineering Task Force (IETF), can optionally be used. SIP is generally more efficient than the H.323 protocol as SIP is specifically intended for IP telephony. Proprietary protocols can also be used.

SIP, by way of example, enables one or more of the following services to be provided, using proxy servers and end user client systems:
1. Call forwarding: call forwarding can be provided in response to one or more of the following conditions: ring-no answer, busy, unconditional call forwarding, address manipulations (such as permanent numbers {e.g. 700 numbers}, free phone numbers {e.g. 800, 866 numbers}, and paid information numbers {e.g. 900 numbers}).
2. Call recipient and calling number identification
3. Personal mobility
4. Caller and call recipient authentication
5. Invitations to a multicast conference
6. Basic Automatic Call Distribution (ACD)

A call may be routed partially over the Internet, using SIP, and partially over a circuit-switched network, such as a PSTN (public switched telephone network). The PSTN may utilize a variety of signaling and other standards, such as the SS7 signaling protocol. Thus, calls disclosed herein (e.g., calls to the softswitch disclosed herein, and outbound calls from the softswitch, including call transfers conferenced calls), can be associated with SS7 signaling, SIP signaling, ISDN-PRI signaling and/or other types of signaling. In addition, calls disclosed herein may originate over the PSTN, a VoIP network, or other network-type.

SIP is a request-response protocol. In one embodiment, SIP can be used for establishing, manipulating and tearing down user sessions, wherein several users can optionally participate in a session. A session can optionally involve multimedia elements including audio, video, instant messaging, and/or other real-time data communications. By way of further example, a session can be an Internet multimedia conference, an Internet telephone call and/or a multimedia distribution session. Optionally, session members can communicate using multicast and/or using a mesh of unicast relations.

SIP can optionally run over UDP (User Datagram Protocol), TCP, IP, ATM, X.25 and/or other protocols. In one embodiment, SIP can work in the Application layer of the Open Systems Interconnection (OSI) communications model.

In one embodiment, SIP invitations are used to create sessions. The invitation can carry session descriptions which enable participants to agree on a set of compatible media types. SIP enables user mobility by providing proxy services and redirecting requests to the user's current location. For example, users can register their current location so that calls can be directed to a telephone or other terminal corresponding to the location.

An example system that can be used to support SIP can include some or all of the following components:
1. An endpoint component, sometimes referred to as a user agent (UA), which can be a hardware and/or software device implementing or compatible with SIP, such as an Internet Protocol (IP) phone or other terminal. The endpoint components can include a client used to initiate calls and a server used to answer calls. By way of further example, a SIP Proxy, a call manager, and a SIP phone, which are discussed herein, can be SIP endpoints.
2. A SIP network server that handles signaling associated with one or more calls. By way of example, in an optional embodiment, the network server provides name resolution and user location. The SIP network server can include one or more additional servers. For example, the SIP server can include a Register server used to receive registration messages from endpoints regarding current user location. Using a mapping database, the Register server can map the SIP addresses with the physical location or locations in the domain where the endpoint is located. The SIP network server can also include a proxy system that transmits call setup and tear down information and optionally forwards SIP messages to multiple proxy servers, creating a search tree, in order for the SIP messages to reach their destination. In addition, a SIP proxy can discover endpoint characteristics of an endpoint by consulting a list of registration templates, including dynamic configuration parameters, for that endpoint. The network server can also include a SIP Redirect server that enables endpoints to locate a desired address by redirecting one or more of the endpoint to another server.

SIP addresses can be the form of uniform resource locators (URL). By way of example, SIP addresses can optionally be embedded in Web pages. In certain applications, a user can click on a SIP address embedded in a Web or other electronic document, and in response, a call can be placed from the user terminal to the SIP address, and the user can then talk to the person or system associated with the SIP address and/or send data files to the person or system associated with the SIP address.

When making a SIP call using a SIP terminal, the SIP terminal locates the appropriate server and then sends a SIP request, such as an invitation that initiates a session. The request may directly reach the intended call recipient, or the request may be redirected or may trigger a chain of new SIP requests by proxies. If a call is to be routed through a number of different proxy servers, a redirect server can be used. When a caller's user agent sends an INVITE request to the redirect server, the redirect server contacts the location server to determine the path to the called party, and then the redirect server sends that information back to the caller. The caller terminal then acknowledges receipt of the information. The caller terminal then sends a request to the device indicated in the redirection information (which could be the call recipient terminal or another server that will forward the request). Once the request reaches the call recipient terminal, the recipient terminal transmits a response and the caller acknowledges the response.

The Real Time Protocol (RTP), Real Time Control Protocol (RTCP), and/or other appropriate protocols can be used to send audio using packets over the Internet to allow the caller and call recipient to verbally communicate. By way of example, the packets can optionally be UDP packets.

Optionally, calls directed to one more selected numbers can be routed by a SIP provider to a call processing system optionally operated by a separate entity than the SIP provider. The call processing system can provide telephone services by integrating with one or more Internet Services Providers (ISP), SIP providers and/or other telephony providers.

A SIP protocol element is optionally provided for returning mobile device status with the TLDN on the SIP Redirect that the MVNE SIP User Agent sends in response to the SIP Invite from a softswitch. The status returned includes the geographic location and whether the device is roaming.

FIG. 1 illustrates an example telecommunications system and an example call handling sequence. In this example, a network enabler, such as a Mobile Virtual Network Enabler (MVNE), interfaces with an enhanced call processing service provider to provide enhanced call processing services to a subscriber such as call screening, call transfer, call conferencing, and/or distinctive ring-back. By way of example, the MVNE may offer billing and backend network elements to other entities that want to offer mobile phone services.

By way of example, the enhanced call processing service provider can be a Mobile Virtual Network Operator (MVNO) or the enhanced call processing service provider and/or an MVNE can offer some or all of the services described herein to MVNO's. By way of further example, an MVNO does not have to own a licensed frequency spectrum, and can resell wireless services under its brand name, using the network of another mobile phone operator.

In the illustrated system, a caller 102 connects to a PSTN 104. The PSTN 104 is in communication with an enhanced call processing service provider's softswitch 108 via a SIP proxy 106 (e.g., associated with a VoIP service provider) and via SS7 signaling protocol. Optionally, a caller's call may be associated with other types of signaling, such as ISDN-PRI. The PSTN 104 is also coupled to a wireless network MSC/VLR 112 using the SS7 signaling protocol. The MSC/VLR 112 is coupled to a base station 114, and the base station 114 wirelessly connects to a mobile phone 116 (e.g., a cellular phone). While the examples described herein refer to a subscriber's mobile or wireless phone, other embodiments utilize a wireline or VoIP communications terminal/phone. The phone address associated with the subscriber may have been number ported to the softswitch 108. The softswitch 108 communicates with an HLR 110 (e.g., optionally associated with an MVNE) using SIP protocol.

Optionally, the subscriber has a terminal 120 (e.g., a personal computer, smart phone, interactive television, etc.) that communicates with the softswitch 108 over a data network 118 (e.g., the Internet). The terminal is optionally equipped with a telecommunications client application 122 that receives and displays call information (e.g., in substantially real-time) regarding calls received for the subscriber at the softswitch 108. The terminal 120 is optionally equipped with a microphone, speaker, and VoIP software and can act as a telephonic device (e.g., a VoIP phone).

Optionally, the softswitch 108 can stream voice messages being left by callers for the subscriber in substantially real time to the client 122. In addition, a call alert, including signaling information associated with a given call, can be transmitted in substantially real time to the client 122. Some or all of the call alert information can be displayed to the user via a terminal display (e.g., a personal computer, wireless phone etc.). Optionally, the call alert notification includes call transition information for a call in substantially real time. Optionally, a sound (e.g., a beep, waves, music, etc.) can be played by the terminal 120 in response to, or under the command of the call alert. Optionally, the subscriber can activate a client control to take the call at the terminal 120, or the subscriber can activate a control to transfer the call to another destination (e.g., another phone/terminal). Optionally, the user can access a call log of calls (e.g., including caller/called party identifiers (e.g., caller name), caller location, phone address, time of call, length of call, etc.) and recorded messages (e.g., recorded and stored on the softswitch). Thus, the client application 122 can be used to screen calls, take calls, and review past calls and associated voice messages. The client application 122 optionally maintains and/or accesses from a remote location the subscriber's contact list, which can be automatically populated from call information.

Presence detection can be performed by the softswitch 108 polling or pinging the subscriber terminal 120 via the telecommunications client application, or by the telecommunications client application transmitting a "Login/I'm alive" message and subsequent periodic "keep alive" messages to the softswitch 108. Optionally, just prior to the normal termination of an online Internet session, the client application 120 sends a "Logout" message to the softswitch 108. Optionally, abnormal Internet session termination conditions are detected by the softswitch 108 timing out the expected Client "Keep alive" message. Thus, the softswitch 108 is aware of the offline/online status of the terminal 120 and client application 122.

FIG. 1 depicts an example call scenario in which a caller initiates a call to a subscriber's destination address answered by the softswitch 108, and the call is routed to the subscriber's mobile device 116 via the softswitch 108 using information from the MVNE HLR 110. The caller's call may have originated over the PSTN or a VoIP network by way of examples. The example call handling sequence is as follows:

1. A caller (via a caller telephonic device) dials a first address (e.g., a phone number) associated with a subscriber's mobile phone 116 (optionally, the first address is associated with the mobile phone 116 by an enhanced call processing service provider associated with the softswitch 108). In another example, the call may have been forwarded to the first address. In this example, the PSTN 104 is informed that that the first address is associated with (e.g., owned by) the VoIP provider discussed above.
2. The first address is recognized in the PSTN (104) as being associated with the VoIP provider and so the call is routed to the VoIP provider switch serving that address.
3. The VoIP provider SIP proxy 106 converts the PSTN call to SIP and informs the softswitch 108 of the call.
4. The softswitch 106 queries the MVNE Home Location Register (HLR) 110 via SIP to obtain the status of the subscriber's mobile device, wherein the softswitch will route/process the call and optionally select a greeting timing using some or all of the information returned by the HLR 110 in response to the query. By way of example, the status can include Ready, Busy with Call Waiting, Busy, Off, No Service, or Available Minutes
5. The MVNE HLR 110 in turn queries the Visitor Location Register 112 of the Mobile Switching Center (MSC) currently serving the mobile device 116. The mobile device 116 in this example is ready to accept a call, and the VLR 112 therefore returns a Temporary Local Directory Number (TLDN) to the HLR 110 for use in routing the call to the device 116. The HLR 110 returns the TLDN and part of the status transmitted to the softswitch 108.
6. The softswitch 108 "dials" the TLDN via SS7, SIP, or other protocol.
7. The PSTN 104 utilizes the TLDN to route the call to the MSC 112 serving the subscriber's mobile device 116 in the given wireless network.
8. The MSC 112 uses the TLDN to consult its VLR for the current location of the mobile device 116 so that it can route the call to the specific base station (BS) 114 serving the device 116.
9. The BS 114 delivers the call to the mobile device 116, and the subscriber answers the call. This causes an Answer indication to be propagated back through the networks to the softswitch 108.
10. When the softswitch 108 receives the Answer indication from the mobile device 116, it opens a channel to a voice mail system within the softswitch 108 and establishes a half-duplex connection. The half-duplex connection enables the subscriber to screen the call while a message from the caller is being recorded by the softswitch (e.g., optionally, the softswitch plays a message, such as a prerecorded message from the subscriber, asking the caller to record a message, and the caller leaves a verbal message). The subscriber can hear a voice message being left by the caller and streamed in substantially real time to the mobile device 116, but the caller cannot hear the called party (e.g., the return talk path is muted). Optionally, the called party can later retrieve the recorded and stored caller message via a telephonic device or a networked computer. Optionally, the voice message is streamed in substantially real time to a networked computer associated with the subscriber and coupled over a network, such as the Internet, to the softswitch 108.
11. The subscriber provides as user input, such as by pressing the 1 key on the mobile device 116 (when key presses are referred to, other appropriate user interfaces, such as other hard or "soft keys, voice commands, etc., can be used as well), to take the call. When the softswitch detects the key press (e.g., detects the corresponding Dual-tone multifrequency (DTMF) tone), optionally, the softswitch stops recording the caller message, and opens up a full-duplex talk path between the caller and the subscriber so that the caller and the subscriber can converse.

While the call is active, the subscriber has the option of providing an instruction (e.g., by keypressing 1) to take the call (end screening), to transfer the call (e.g., by keypressing 2), or to conference in other parties (e.g., by keypressing 3). If the subscriber's mobile device had been turned off or busy, the softswitch 108 would be so informed in response to the HLR query and would act appropriately (e.g., by taking a message or by delivering the call to a different phone/destination used by the subscriber).

Optionally, when the mobile device 116 originates a call, the call does not pass through the softswitch 108 (e.g., the call is routed conventionally and/or using routing mechanisms that are standard at the time the call is routed). Optionally, even if the call is not routed via the softswitch 108, the call detail records for the call are sent to the softswitch operator (e.g., via the MVNE) for use in accounting/billing. For example, the call detail record can contain system usage information, such as the identities of sources, destination/endpoint identities, the duration of each call, the amount billed for each call, the total usage time in the billing period, the total free time remaining in the billing period, and/or the running total charged during the billing period. The mobile device optionally supports data connections to Internet-based services. Optionally, each data session is reported to the softswitch and/or softswitch operator by the MVNE after the session completes so that the usage can be tracked and billed.

A user can subscribe to one or more services and/or purchase/lease a communications device (e.g., a mobile telecommunications device), as described herein, via a website hosted by the softswitch 108 and/or operated by the softswitch operator. For example, the user can register via a web page form, and provides some or all of the following information which is stored in a softswitch subscriber database:
  Name
  Billing address
  Shipping address,
  Home phone number
  Email address
  Billing method selected
  Optional credit card number and expiration date
  Account preferences An account management interface (e.g., in the form of one or more Web pages) can be accessed by the subscriber. Via the account management interface, subscribers can access account information and make configuration changes. The interface optionally includes one or more of the following sections:
  Account Summary—summarizes selected service, phone numbers, and address information
  Choose Features—lists features with their current settings and allows subscriber to modify them
  Review Billing—lists current outstanding charges and how billing is to occur; for Postpaid service this includes charges per call; it also states any SMS and data connection charges
  Get Help—menu of areas in which to get help
  Tell Your Friends—opportunity to tell others about the service offered by the softswitch operator.

The softswitch optionally hosts and stores electronic address books for subscribers, wherein a subscriber can update the address book, edit contact records, or add contact records via Web forms hosted by the softswitch.

If the user purchases a mobile device, such as mobile device 116 described herein, the mobile device is optionally shipped to the specified shipping address. Optionally, the user may purchase the mobile device at a "brick and mortar" physical retail location. The mobile device can be configured for and used for some or all of the following: making and receiving calls; composing, sending, and receiving SMS messages; for instant messaging; for sending and receiving emails, etc. The mobile device can comply with one or more wireless network standards (e.g., GSM, CDMA, GPRS, HSCSD, 1xRTT, EDGE, W-CDMA, 1xEV, TD-SCDMA, HSDPA, HSUPA, other protocol, etc.).

Optionally, the mobile device is equipped with a SIM card (e.g., a subscriber identity module which securely stores a mobile phone service subscriber identifier, subscription information, contact lists (e.g., including some or all of the following: names, phone numbers, addresses, email addresses, etc.) preferences, text messages, and/or network state information, such as its current location area identity (LAI)), or the like. The SIM card in the mobile device, and the mobile device itself, are uniquely identified to the wireless network. Optionally, the SIM card and mobile device identities are captured and recorded in the softswitch 108 as part of provisioning prior to shipping the device 116 to the user. Provisioning optionally involves interfacing with the MVNE Business-to-Business (B2B) interface to provision the assigned mobile device in the MVNE HLR 110.

The mobile device 116 optionally includes a display, including icons (which can be turned on and off, change their appearance, and/or change their color) for indicating if there is unheard voice mail, for indicating SMS message status, for indicating if there is unread email, etc. Optionally, the mobile device is configured with a speed dial (e.g., the 1 key) for accessing voice mail. Optionally, the mobile device supports data connections (e.g., has wireless Internet access), is equipped with a browser, has an email client to receive/send emails, and has instant messaging client to receive/send instant messages.

Optionally, the mobile device is configured to synchronize the contact list stored in its SIM card with the subscriber's contact list stored in the softswitch. The synchronization is optionally performed when manually requested by the subscriber from the mobile device or via an account manager user interface. Optionally, the synchronization is automatically performed when an edit has been made to the SIM contact list or the subscriber's softswitch contact data store, if the mobile device is on and connected.

The account provisioned for the subscriber can include some or all of the features/services listed in Table 1, and/or additional or different features/services. The subscriber account record (stored in the subscriber database) can include corresponding settings, with optional defaults.

TABLE 1

| Feature | Description | Default Setting |
| --- | --- | --- |
| Mobile Call Screening | The ability to answer a call and listen while the caller records a message without the caller hearing the subscriber. The subscriber may enable it for all calls and enable/disable it for individual contacts. During a call the subscriber can end screening by keypressing 1. | On |

TABLE 1-continued

| Feature | Description | Default Setting |
|---|---|---|
| Mobile Call Transfer | The ability of a subscriber to transfer a call by providing a corresponding user input (e.g., keypressing 2) during a call. The subscriber may configure the Mobile Call Transfer Number to be used for the transfer. Multiple transfer numbers can be specified if the Mobile Location feature is enabled. | Home phone number |
| Mobile Locator | Knowledge of the geographic location of the mobile device when delivering calls to the subscriber. The package subscribed to determines whether this feature is allowed. If the feature is allowed, the subscriber may enable/disable the feature. With this feature, the subscriber is allowed to specify multiple Mobile Call Transfer Numbers and associate a geographic location with each to assist in determining where to transfer a call. | Depends on service package subscribed to |
| Follow Me Home | Auto-transfer to the Mobile Call Transfer Number when the mobile device is off or out-of-range. The subscriber may enable/disable this feature. | Depends on service package subscribed to |
| Conferencing | The ability of a subscriber to conference in additional parties during a call by providing a corresponding user input (e.g., keypressing 3). Optionally, a limit on the number of participants is set in the package offer and/or a global limit is set. | Depends on service package subscribed to |
| Distinctive Ringback | The subscriber can select from a set of ring tones to be used when playing ringback to the caller. | Standard ringback |
| Private Number Screening | Prompting callers whose caller ID is blocked to reveal/unblock their caller ID in order for the call to be presented to the subscriber. subscriber may enable/disable this feature. | Depends on The service package subscribed to |
| Telemarketer Blocking | Testing a call for telemarketing behavior and if detected, reject the call by returning busy. The subscriber may enable/disable this feature. | Depends on service package subscribed to |
| Spoken Greeting | The greeting that is played to the caller in conjunction with screening or taking a message can be a standard system greeting, a spoken name greeting, or a personal greeting. The subscriber may record a name or personal greeting and may choose whether prompts are to be in a male or female voice. | Standard system greeting in female voice |
| Payment Plan | The payment for mobile service can be, by way of example, Prepaid, Postpaid, or Flat Rate. With Prepaid payment, once the allocated minutes are consumed, limited services are provided until the minutes are recharged (e.g., emergency 911 calls may be allowed, but not other calls). With Postpaid payment, the cost of individual service usage is summarized in the billing section of the user's account which is accessible online (e.g., via a browser or a dedicated client). This feature is configured as per the package subscribed to. | Depends on service package subscribed to |
| Domestic Roaming | The ability of the subscriber to use their mobile device within the US but outside of their local mobile serving area. This feature is enabled or disabled per the package subscription with region-based rates. When this feature is enabled, the softswitch is aware of whether the mobile device is in roaming mode or not when the Softswitch is determining how to handle and incoming call. | Depends on service package subscribed to |

Optionally, some or all of the feature/service/default settings can be adjusted by the subscriber via an account management user interface, optionally hosted by the softswitch 108. By way of example, the subscriber can optionally access the account management user interface as a Web page via a browser, or by phone by calling an automated interactive voice response system and/or a human operated service center.

The phone number assigned to the subscriber for some of the services described herein is sometimes referred to herein, for convenience and not by way of limitation, as a mobile access address. By way of example, the mobile access address can be a United States or foreign phone number assigned directly by the enhanced call processing service provider (e.g., the operator of the softswitch 108), by the enhanced call processing service provider via its VoIP provider partnership, by a third party, or otherwise. Optionally, the initial use of the mobile access address service may be limited to a particular geographical/regional area (e.g., a particular portion of the United States or a foreign country) and not involve both partners.

In an example optional embodiment, where the enhanced call processing service provider and an MVNE are involved in providing some or all of the services described herein, when the mobile access address is assigned to a subscriber, a Business-to-Business (B2B) interface between the enhanced call processing service provider and the MVNE propagates the phone address into the MVNE HLR. This causes the phone address to be directly associated with the mobile device in terms of addressing for voice/data network connections to/from the device.

A subscriber may have additional virtual phone numbers assigned to their account, e.g., a number with an area code of another locality so that family and friends in that locality can make a local call to the subscriber. The subscriber can receive calls on these additional numbers. Optionally, these virtual numbers will not be used as the caller ID in an outgoing call, although optionally the virtual numbers will be used as the caller ID in an outgoing call.

Optionally, the mobile access address/virtual phone number are ported to/from the softswitch or a partner of the softswitch operator via Local Number Portability (LNP).

The call routing processes and controls will now be described in greater detail.

In the example illustrated in FIG. 1, incoming calls to the subscriber's mobile access address route through the softswitch 108. The softswitch handles the incoming call per the subscriber's service/feature settings, examples of which are described in Table 1 above, and the current device status. The status of the subscriber's mobile device is obtained by querying the HLR 110 via the MVNE SIP User Agent. Examples of possible status values returned and the associated action are described in Table 2 below, and additional, fewer, or different status values can be used.

TABLE 2

Mobile Device Status from HLR

| Status | Description | Action |
| --- | --- | --- |
| Ready | Mobile device is ready to accept a call, | Route call to device via supplied TLDN. |
| Busy w/Call Waiting | Mobile device is servicing a call but has Call Waiting enabled and thus is ready to accept another call | Route call to device via supplied TLDN. |
| Busy | Mobile device is servicing a call or data session and is unable to service another call. | Record a message. |
| Off | Mobile device turned off or out-of-range | Deliver call to Mobile Call Transfer Number if configured; otherwise take a message. |
| No Service | No wireless service on record for this number | This indicates the service is misconfigured. Throw an exception and record a message. |

As part of the status information, the MVNE HLR 110 optionally returns an indication as to whether the mobile device is roaming and/or the geographic coordinates of the mobile device. This information assists in determining where to transfer a call. If the subscriber has prepaid calling, the softswitch optionally also uses the minute balance it maintains to determine how to handle the call.

As previously discussed, the softswitch can determine the online/offline status of the telecommunications client hosted on the subscriber's terminal. If the client is running and the terminal is online, incoming calls are optionally presented via the telecommunications as well as to the mobile device. The subscriber has the option of ignoring the call (in which case the softswitch will optionally record a message from the caller for later retrieval and playback by the subscriber), screening the call (in which case the communication path is in half-duplex mode so that the subscriber can hear the caller leave a message, but the caller cannot hear the subscriber), taking the call (in which case the communication path is in full duplex mode so that the caller and the subscriber can converse and hear each other), or by transferring the call via either the mobile device or the client application to another destination. If a user of the telecommunications client user and a user of the mobile device both choose to take or transfer the call and that action is successful, the users of the client and mobile device are conferenced together with the caller.

Note that for the mobile access address service, in an example embodiment a Gateway MSC is not required since calls to the mobile device do not have to route directly to the wireless network. In such an example embodiment, the softswitch and MVNE HLR perform the gateway function.

Application of the above routing processes and controls is described in more detail below with respect to several example call scenarios. In these example scenarios, the ringback to the caller is controlled by the distinctive ringback feature setting, although a default, standard ring can be used as well.

In this example, the softswitch is configured to deliver a call to the subscriber's mobile device if the subscriber's account is not out of minutes and the device's status is Ready or Busy w/Call Waiting. To route the call, the softswitch uses the TLDN returned by the MVNE HLR as part of the request for status. The HLR database contains the address of the VLR associated with the MSC currently serving the mobile device and it is from this VLR that it obtains the TLDN.

The softswitch dials the TLDN to deliver the call. The following scenarios may result depending on the feature settings and the subscriber behavior:

Call is not answered, so a message is recorded by the softswitch

Call is answered and screening is disabled, so a full duplex call path is established.

Call is answered with screening enabled and while a message is being recorded, the subscriber provides a user input (e.g., presses key 1) to cause the call path to be changed from half- to full-duplex.

After a call is answered, the subscriber provides a user input (e.g., keypresses 2) to transfer the call to the Mobile Call Transfer Number independent of whether screening is active.

After a call is answered, the subscriber provides a user input (e.g., keypresses 3) to conference in other parties independent of whether screening is active.

Call is answered and the account runs out of minutes before it completes.

In the forgoing scenarios private number screening and telemarketer blocking may be invoked at the beginning of the call depending on the subscriber's feature settings and the type of call.

These call scenarios are described in more detail below. In the example scenarios, where a connection to the mobile device is established, optionally minutes of usage is tracked and deducted from the subscriber's account if prepaid calling is configured.

Figure 2:
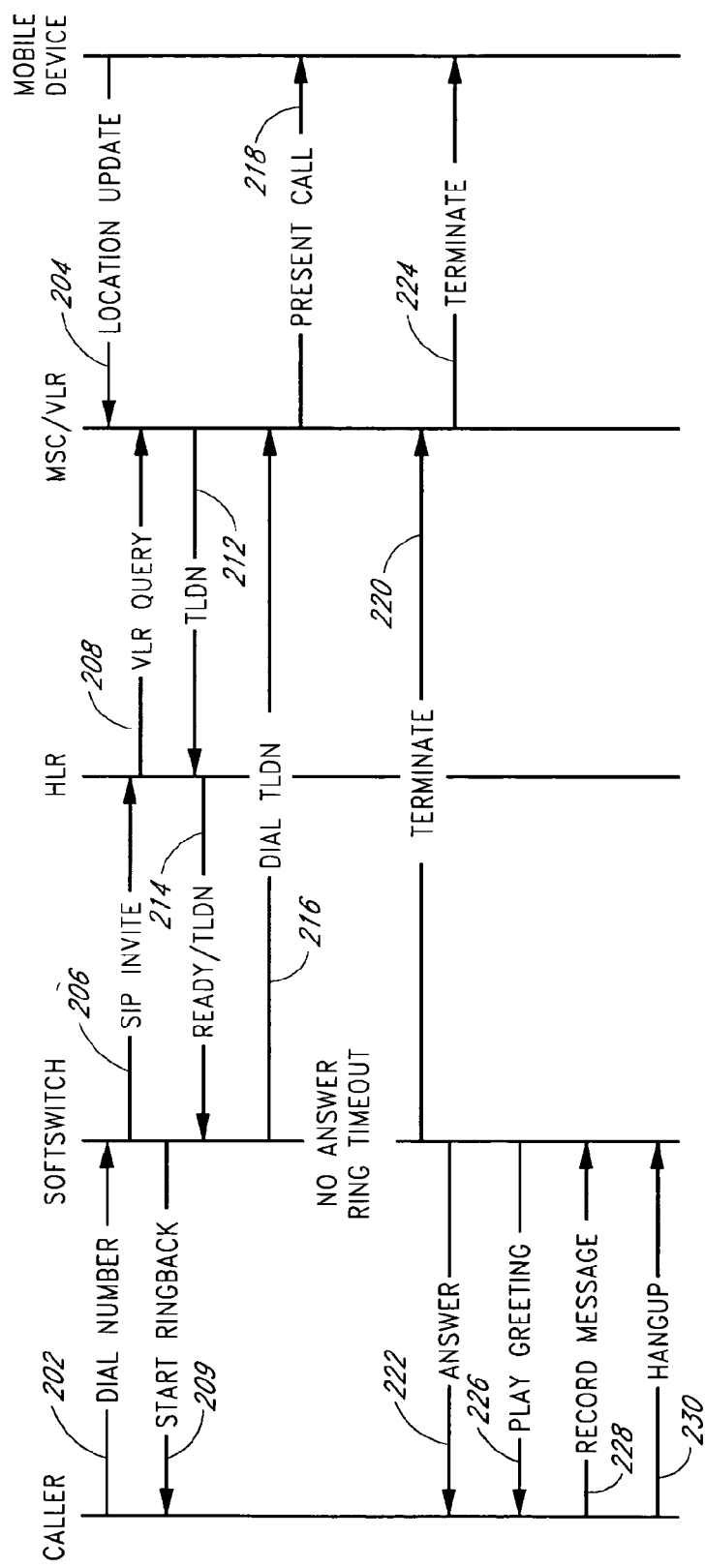
FIG. 2 illustrates an example call process for an unanswered call.

If, during the period between receiving the mobile device status from the HLR and attempting to deliver the call, the status of the mobile device changes (e.g., the subscriber initiates a call from the mobile device, turns the phone off, or goes out of range), the softswitch prompts the caller to record a message similar to the scenario illustrated in FIG. 2.

FIG. 2 illustrates an example call process for an unanswered call. In this example, in the MVNE HLR, forwarding on busy and no answer is disabled for subscribers with the mobile access address service so that the softswitch can handle voice mail for the subscriber.

At state 202, a caller (via a caller telephonic device) dials a mobile access address associated with a subscriber's mobile device and the caller's call reaches a softswitch. At state 204, a location update for the mobile device is performed by the MSC/VLR. At state 206, the softswitch transmits a SIP invite to the HLR. At state 208, the HLR transmits a VLR query to the MSC/VLR. At state 209, the softswitch initiates a ringback to the caller telephone. At state 212, the MSC/VLR returns the TLDN to the HLR for use in routing the call to the mobile device. At state 214, the HLR returns the TLDN and the status of Ready to the softswitch. At state 216, the softswitch "dials" the TLDN via SS7, SIP, or other protocol. The PSTN utilizes the TLDN to route the call to the MSC serving the subscriber's mobile device. The MSC uses the TLDN to consult its VLR for the current location of the mobile device so that it can route the call to the base station serving the mobile device.

At state 218, the base station presents the call to the mobile device. In this example, the wireless device is not answered, and at state 220, after a predetermined amount of time or number of rings, a timeout condition occurs, and the softswitch designates the call unanswered, and at state 224, the call to the mobile device is terminated. At state 222, the softswitch answers the call. At state 226, the softswitch plays a greeting to the caller which prompts the caller to leave a message. At state 228, the caller provides a verbal message which is recorded by the softswitch and stored in voicemail for later retrieval by the subscriber. At state 230, the softswitch terminates the inbound call from the caller.

Figure 3:
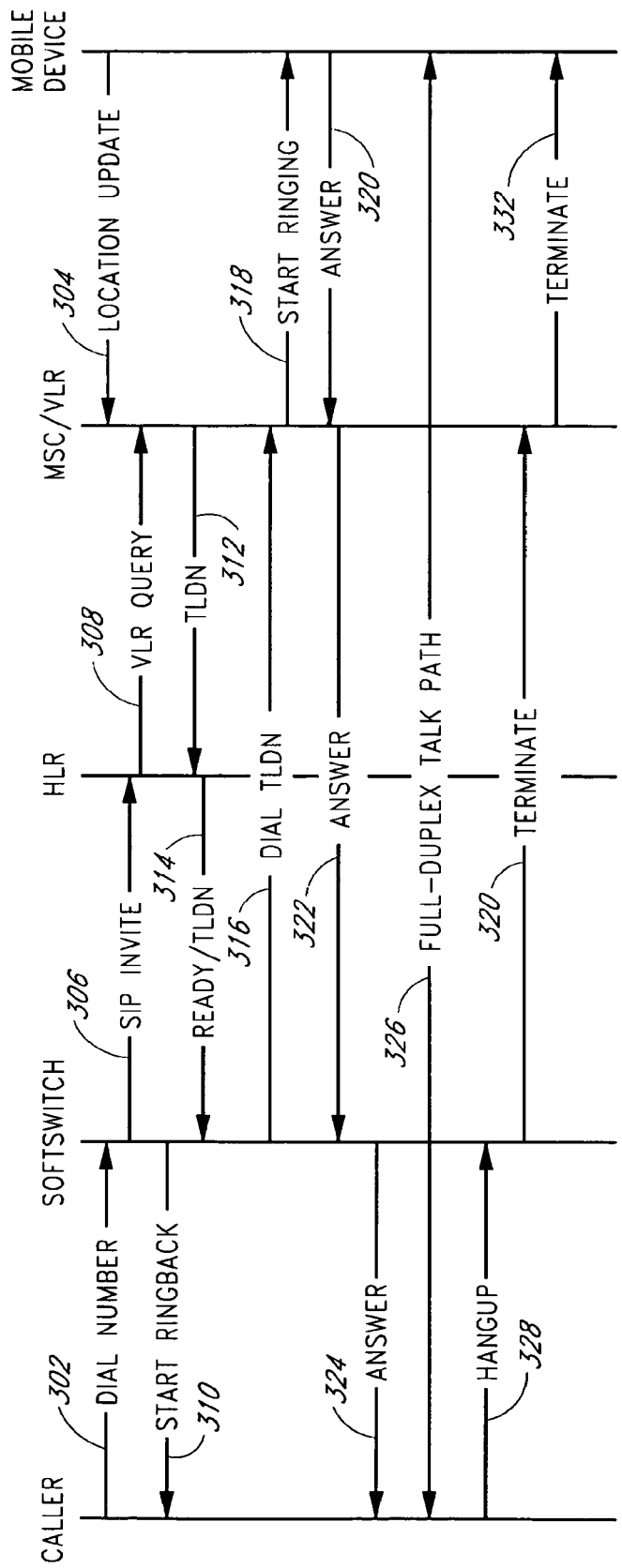
FIG. 3 illustrates an example call process for an answered call.

FIG. 3 illustrates example call handling for the scenario where the mobile device is answered and mobile call screening is disabled. At state 302, a caller (via a caller telephonic device) dials a mobile access address associated with a subscriber's mobile device, and the caller's call reaches a softswitch. At state 304, a location update for the mobile device is performed by the MSC/VLR. At state 306, the softswitch transmits a SIP invite to the HLR. At state 308, the HLR transmits a VLR query to the MSC/VLR. At state 310, the softswitch initiates a ringback to the caller telephone. At state 312, in response to the query, the MSC/VLR returns the TLDN to the HLR for use in routing the call to the mobile device. At state 314, the HLR returns the TLDN and the status of Ready to the softswitch. At state 316, the softswitch "dials" the TLDN via SS7, SIP, ISDN-PRI, or other protocol, to place an outcall to the mobile device. The PSTN utilizes the TLDN to route the call to the MSC serving the subscriber's mobile device. The MSC uses the TLDN to consult its VLR for the current location of the mobile device so that it can route the call to the base station serving the mobile device.

At state 318, the base station associated with the MSC/VLR rings the mobile device. At state 320, the subscriber answers the mobile device. At state 322, an Answer status is returned from the MSC/VLR to the softswitch, and at state 324, the softswitch answers the inbound call from the caller. The caller call and the outcall are bridged, and because call screening is not enabled, at state 326, a full duplex talk path is automatically established between the caller and the wireless device. At state 328, the caller hangs up. At state 330, the softswitch sends a terminate indication to the MSC/VLR, and at state 332 the call is terminated at the mobile device. If the subscriber has Prepaid or Postpaid service, the softswitch updates the subscriber's usage records in its database when the call terminates.

Figure 4:
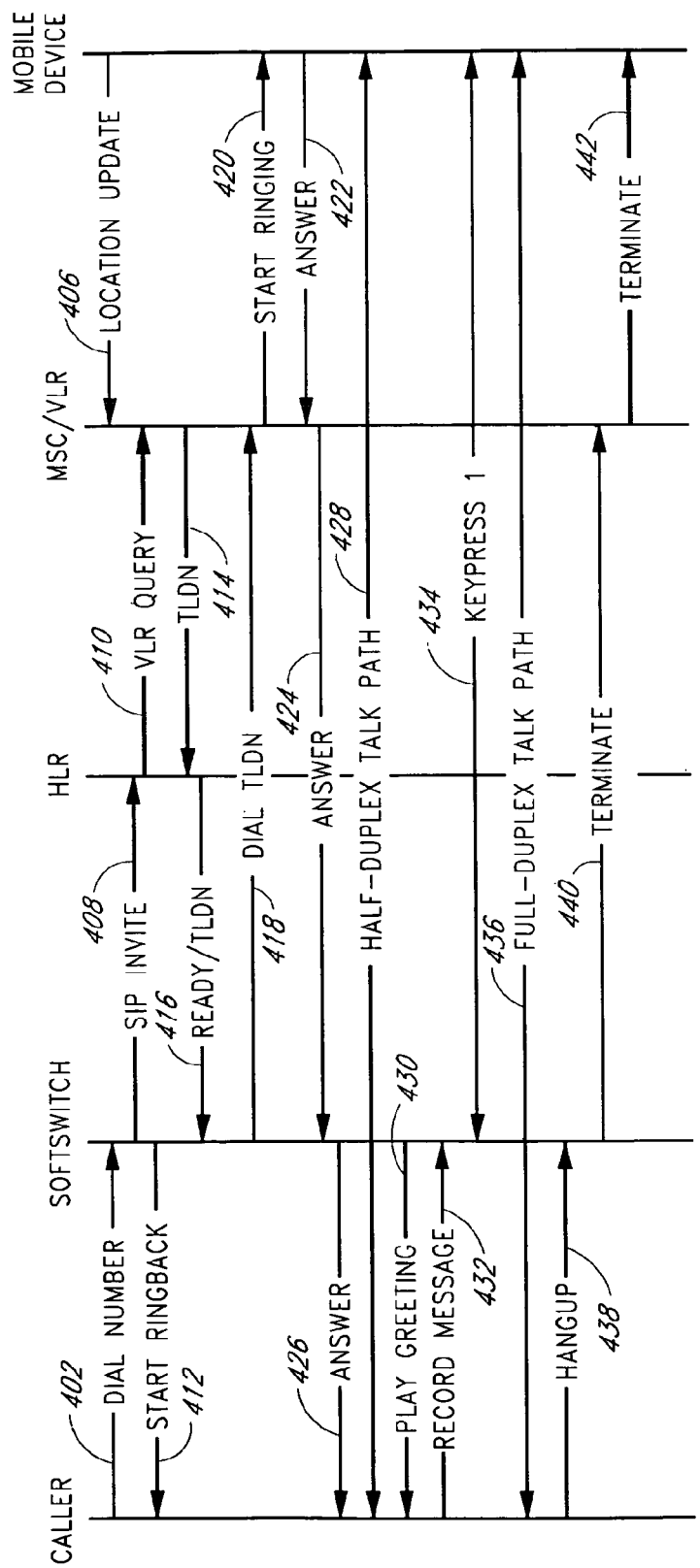
FIG. 4 illustrates an example call screening process.

FIG. 4 illustrates an example call screening process. In this example, the mobile device is answered and mobile call screening is enabled. The subscriber instructs the softswitch to end call screening and to connect the subscriber to the caller in full duplex mode (e.g., by pressing the 1 key to end screening and take the call).

At state 402, a caller (via a caller telephonic device) dials a mobile access address associated with a subscriber's mobile device and the caller's call reaches a softswitch. At state 406, a location update for the mobile device is performed by the MSC/VLR. At state 408, the softswitch transmits a SIP invite to the HLR. At state 410, the HLR transmits a VLR query to the MSC/VLR. At state 412, the softswitch initiates a ringback to the caller telephone. At state 414, the MSC/VLR returns the TLDN to the HLR for use in routing the call to the mobile device. At state 416, the HLR returns the TLDN and the status of Ready to the softswitch. At state 418, the softswitch "dials" the TLDN to place an outcall to the mobile device. The PSTN utilizes the TLDN to route the call to the MSC serving the subscriber's mobile device. The MSC uses the TLDN to consult its VLR for the current location of the mobile device so that it can route the call to the base station serving the mobile device.

At state 420, the base station associated with the MSC/VLR rings the mobile device. At state 422, the subscriber answers the mobile device. At state 424, an Answer status is returned from the MSC/VLR to the softswitch, and at state 426, the softswitch answers the inbound call from the caller. The caller call and the softswitch outcall are bridged. Because call screening is enabled, at state 428, a half duplex talk path is automatically established between the caller and the wireless device so that the subscriber can hear a message left by the caller, and the caller cannot hear the called party.

At state 430, the softswitch plays a message to the caller asking the caller to leave a message. At state 432, the softswitch records a message from the caller. At state 434, the subscriber activates a control (e.g., presses the 1 key on the mobile device) to indicate that the subscriber wants to accept the call. At state 436, the softswitch establishes a full duplex communication path.

At state 438, the caller hangs up. At state 440, the softswitch sends a terminate indication to the MSC/VLR, and at state 442 the call is terminated at the mobile device. If the subscriber has Prepaid or Postpaid service, the softswitch updates the subscriber's usage records in its database when the call terminates.

Figure 5:
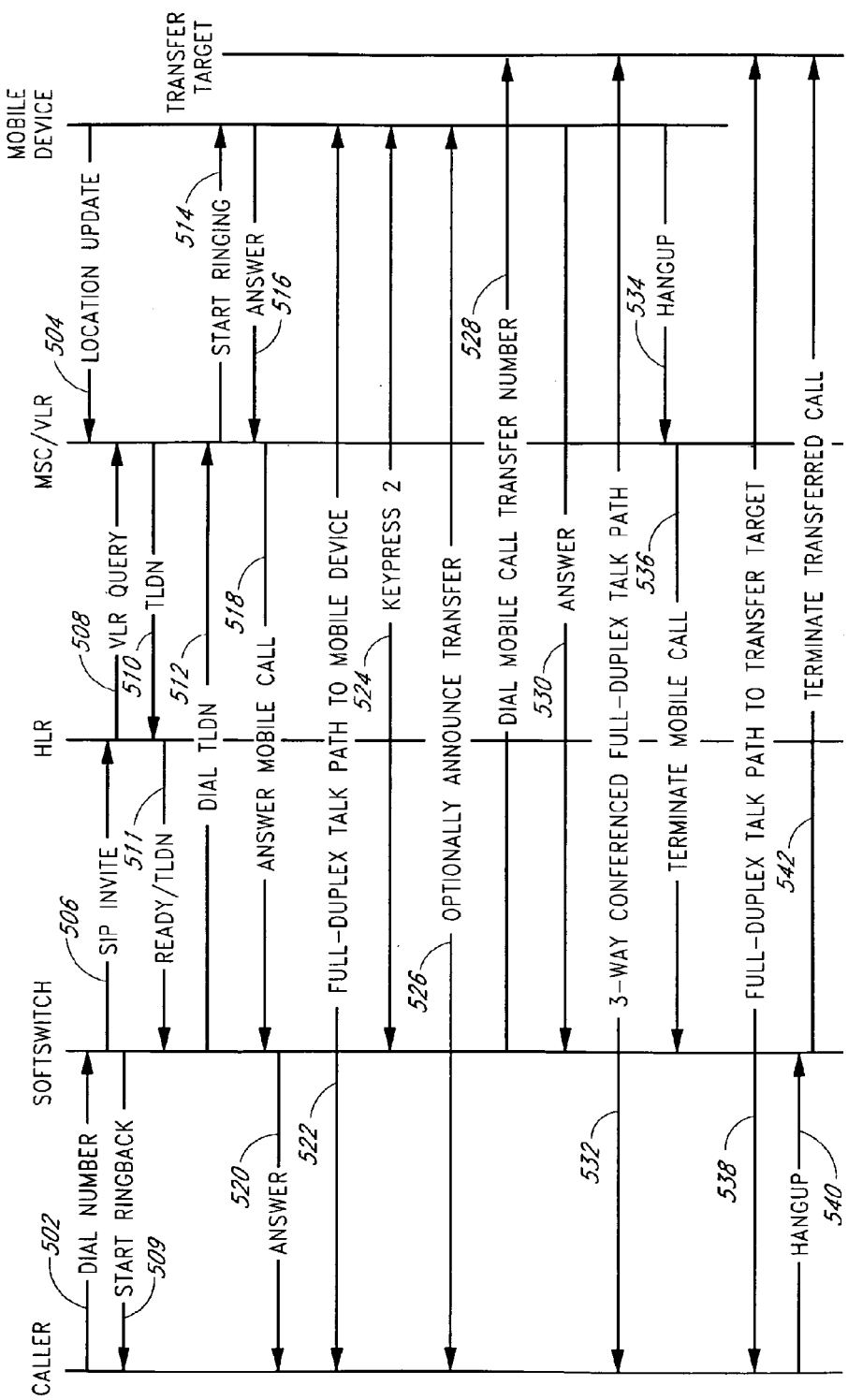
FIG. 5 illustrates an example call transfer process.

FIG. 5 illustrates an example call transfer process. In this example, the mobile device is answered and the subscriber provides a call transfer instruction to transfer the call to a mobile call transfer number, assuming one is configured. The subscriber can hang up the mobile device after providing the transfer instruction, and if that leg of the call is not terminated before the transferred call leg is established, the three call legs are conferenced together. A party associated with the legs can hang up without affecting the communication path between the other two terminals.

If, during a call transfer, the softswitch detects that the called number is busy, not answered, or answered by voice mail or an answering machine, the softswitch optionally announces to the remaining call participants that the transfer failed.

If the Mobile Locator feature is enabled and multiple Mobile Call Transfer Numbers are configured, the geographic location of the subscriber's mobile device, if available, is compared to that of each number to determine whether the device is in its proximity. If there is a match, the call is transferred to that number; otherwise all of the Mobile Call Transfer Numbers are optionally called simultaneously and conferenced together as they are answered.

Referring to FIG. 5, at state 502, a caller (via a caller telephonic device) dials a mobile access address associated with a subscriber's mobile device and the caller's call reaches a softswitch. At state 504, a location update for the mobile device is performed by the MSC/VLR. At state 506, the softswitch transmits a SIP invite to the HLR. At state 508, the HLR transmits a VLR query to the MSC/VLR. At state 509, the softswitch initiates a ringback to the caller telephone. At state 510, the MSC/VLR returns the TLDN to the HLR for use in routing the call to the mobile device. At state 511, the HLR returns the TLDN and the status of Ready to the softswitch. At state 512, the softswitch "dials" the TLDN to place an outcall to the mobile phone. The PSTN utilizes the TLDN to route the call to the MSC serving the subscriber's mobile device. The MSC uses the TLDN to consult its VLR for the current location of the mobile device so that it can route the call to the base station serving the mobile device.

At state 514, the base station associated with the MSC/VLR rings the mobile device. At state 516, the subscriber answers the mobile device. At state 518, an Answer status is returned from the MSC/VLR to the softswitch, and at state 520, the softswitch answers the inbound call from the caller. At state 522, a full duplex talk path is automatically established between the caller and the wireless device. At state 524, the subscriber provides a call transfer instruction (e.g., by pressing the 2 key on the mobile device).

At state 526, the softswitch transmits a voice message to the caller and the subscriber, informing them that a call transfer is about to take place. At state 528, in response to the transfer instruction, the softswitch dials a mobile call transfer number associated with a transfer target device. At state 530, the subscriber answers the device associated with the mobile call transfer number. At state 532, the softswitch establishes a 3-way conferenced full-duplex talk path between the caller, the mobile device, and the transfer target device. At state 534, the subscriber hangs up the mobile device. At state 536, the MSC/VLR sends a call terminate message to the softswitch. At state 538, a full-duplex path between the caller and the transfer target is maintained even though the mobile device has hung up. At state 540, the caller hangs up. At state 542, the softswitch terminates the transferred call to the transfer target device. If the subscriber has Prepaid or Postpaid service, the softswitch updates the subscriber's usage records in its database when the call terminates.

Figure 6:
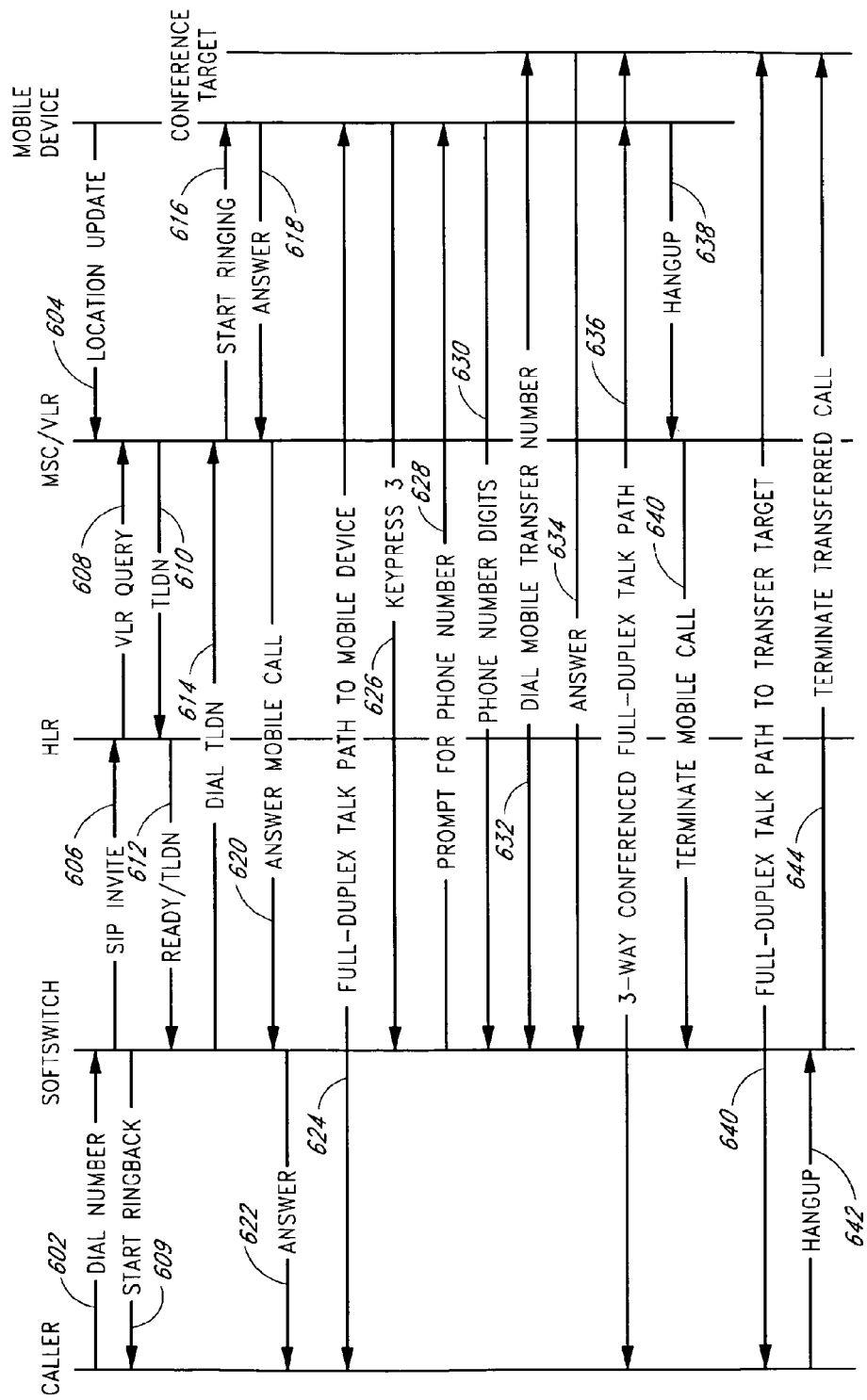
FIG. 6 illustrates an example call conferencing process.

FIG. 6 illustrates an example call conferencing process. In this example, the subscriber answers the mobile device, and instructs the softswitch (e.g., via a key press of 3 on the mobile device key pad) to conference in another party. Optionally, if conferencing is enabled, a maximum number of participants allowed in a conference is controlled in the feature package for the subscriber. Thus, for example, some subscribers may be restricted to a 3-way conference, while some subscribers may be allowed up to a 6-way conference. Optionally, all the subscribers may be limited to a certain number of conference legs (e.g., a 6-way conference).

Optionally, the conference will not terminate just because one member of the conference hangs up. Optionally, the conference will be maintained as long as two participants remain on the call/until only one member remains on the call. Optionally, if the conference initiator/subscriber hangs up, the conference will terminate even if two or more participants still remain.

If during an attempt to add a person to the conference, the softswitch detects that the called number is busy, not answered, or answered by voice mail or an answering machine, the softswitch provides an audible and/or visual announcement to the conference attendees that the requested person is not available.

Referring to FIG. 6, at state 602, a caller (via a caller telephonic device) dials a mobile access address associated with a subscriber's mobile device and the caller's call reaches a softswitch. At state 604, a location update for the mobile device is performed by the MSC/VLR. At state 606, the softswitch transmits a SIP invite to the HLR. At state 608, the HLR transmits a VLR query to the MSC/VLR. At state 609, the softswitch initiates a ringback to the caller telephone. At state 610, the MSC/VLR returns the TLDN to the HLR for use in routing the call to the mobile device. At state 612, the HLR returns the TLDN and the status of Ready to the softswitch. At state 614, the softswitch "dials" the TLDN to place an outcall to the mobile device. The PSTN utilizes the TLDN to route the call to the MSC serving the subscriber's mobile device. The MSC uses the TLDN to consult its VLR for the current location of the mobile device so that it can route the call to the base station serving the mobile device.

At state 616, the base station associated with the MSC/VLR rings the mobile device. At state 618, the subscriber answers the mobile device. At state 620, an Answer status is returned from the MSC/VLR to the softswitch, and at state 622, the softswitch answers the inbound call from the caller. The caller call and the outcall from the softswitch are bridged. At state 624, a full duplex talk path is automatically established between the caller and the wireless device so that the caller and subscriber can converse. At state 626, the subscriber provides a call conference instruction (e.g., by pressing the 3 key on the mobile device).

At state 628, the softswitch transmits a voice prompt to the subscriber asking for the phone address/number to which the third leg of the conference is to be directed. At state 630, the subscriber enters the desired phone number (e.g., by pressing corresponding mobile device key pad keys, by selecting a phone number for a contact database on the mobile device, by speaking the phone number, by speaking an identifier associated with the phone number, such as a name, etc.), such as a mobile transfer number. At state 632, in response to the conference instruction, the softswitch dials the specified phone number. At state 634, the call is answered at the conference target. At state 636, the softswitch establishes a 3-way conferenced full-duplex talk path to enable the three parties to converse, wherein the caller, the mobile device, and the conferenced target are conferenced together. At state 638, the subscriber hangs up the mobile device.

In response, at state 640, the MSC/VLR sends a mobile call terminate message to the softswitch. At state 640, a full-duplex path between the caller and the transfer target is maintained. At state 642, the caller hangs up. At state 644, the softswitch terminates the call to the conference target. If the subscriber has Prepaid or Postpaid service, the softswitch updates the subscriber's usage records in its database when the call terminates.

Figure 7:
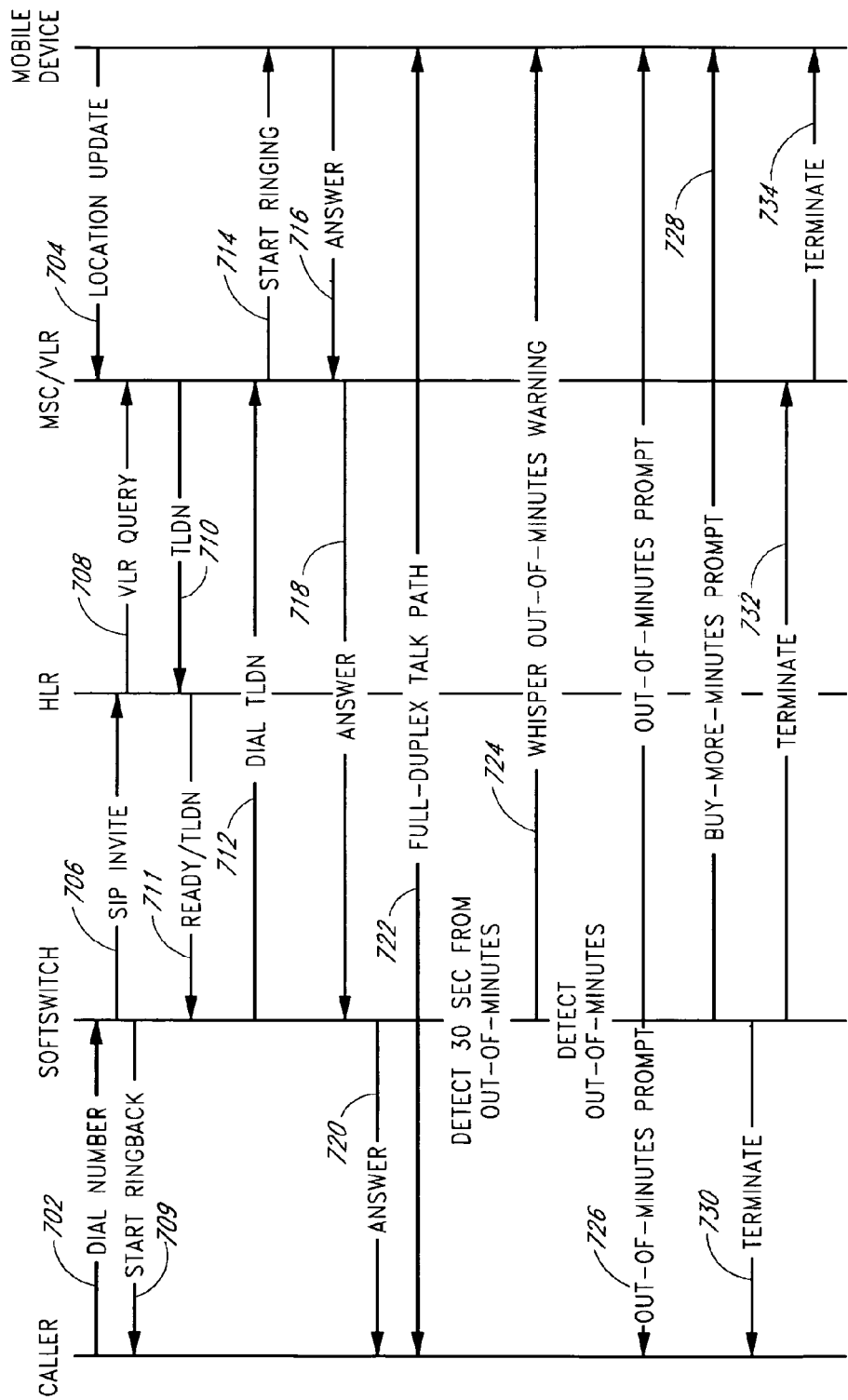
FIG. 7 illustrates an example call process wherein a call participant exhausts the participant's associated call minutes.

FIG. 7 illustrates an example call process wherein a call participant exhausts the participant's associated call minutes (e.g., prepaid call minutes associated with the subscriber's mobile device, a calling card, an access code, etc.). In this example, a warning (e.g., an audible warning, such as a beep or a verbal message that only the subscriber can hear and that the other call participants cannot hear, wherein optionally the warning is played at a relatively lower volume as compared to typical audible message played by the softswitch) when a specified/predetermined amount of call time remains (e.g., 30 seconds, 60 seconds, or other time period). The call is terminated when the minutes/prepaid calling time fully expire, but optionally, first a prompt is played to the call participants indicating that the call is being terminated.

Referring to FIG. 7, at state 702, a caller (via a caller telephonic device) dials a mobile access address associated with a subscriber's mobile device and the caller's call reaches a softswitch. At state 704, a location update for the mobile device is performed by the MSC/VLR. At state 706, the softswitch transmits a SIP invite to the HLR. At state 708, the HLR transmits a VLR query to the MSC/VLR. At state 709, the softswitch initiates a ringback to the caller telephone. At state 710, the MSC/VLR returns the TLDN to the HLR for use in routing the call to the mobile device. At state 711, the HLR returns the TLDN and the status of Ready to the softswitch. At state 712, the softswitch "dials" the TLDN via SS7, SIP, or other protocol to place an outcall to the mobile device. The PSTN utilizes the TLDN to route the call to the MSC serving the subscriber's mobile device. The MSC uses the TLDN to consult its VLR for the current location of the mobile device so that it can route the call to the base station serving the mobile device.

At state 714, the base station associated with the MSC/VLR rings the mobile device. At state 716, the subscriber answers the mobile device. At state 718, an Answer status is returned from the MSC/VLR to the softswitch, and at state 720, the softswitch answers the inbound call from the caller. Because call screening is not enabled, the inbound call and the outcall are bridged at state 722, and a full duplex talk path is automatically established between the caller and the wireless device. During the connection time, a determination is made that a first time threshold (e.g., 30 minutes) has been reached prior to the complete usage of the call time remaining. In response, at state 724, the softswitch plays or whispers (mixes incoming audio signal/called party speech with lower level audio prompt) an out-of-time warning (e.g., "You have only 30 seconds of call time remaining" or a beep tone) via the talk path to the mobile device, wherein the other call participant(s) optionally are prevented from hearing the warning.

At state 726, the softswitch plays an "out of call time" warning prompt, which optionally states that the call time has been used up and/or that the call is about to be terminated. At state 728, the softswitch plays a prompt asking the subscriber if the subscriber wants to purchase additional call time. The message can specify how the subscriber can provide a response (e.g., press 5 on the telephonic device to purchase an additional 1 hour of call time, press 6 to purchase an additional 2 hours of call time, and press 7 to decline to purchase additional call time; or provide a verbal command indicating how much call time the subscriber wants to purchase). Optionally, if the subscriber does not respond to the prompt, the softswitch interprets the lack of response as indicating that the subscriber does not want to purchase additional call time during the present call.

In this example, the subscriber fails to respond to the purchase additional call time prompt within a predetermined window of time (e.g., within 5 seconds after the end of the prompt), and so at state 730, the softswitch terminates the call to the caller. At state 732, the softswitch sends a terminate indication to the MSC/VLR, and at state 734 the call is terminated at the mobile device. The softswitch updates the subscriber's usage records in its database when the call terminates.

Figure 8:
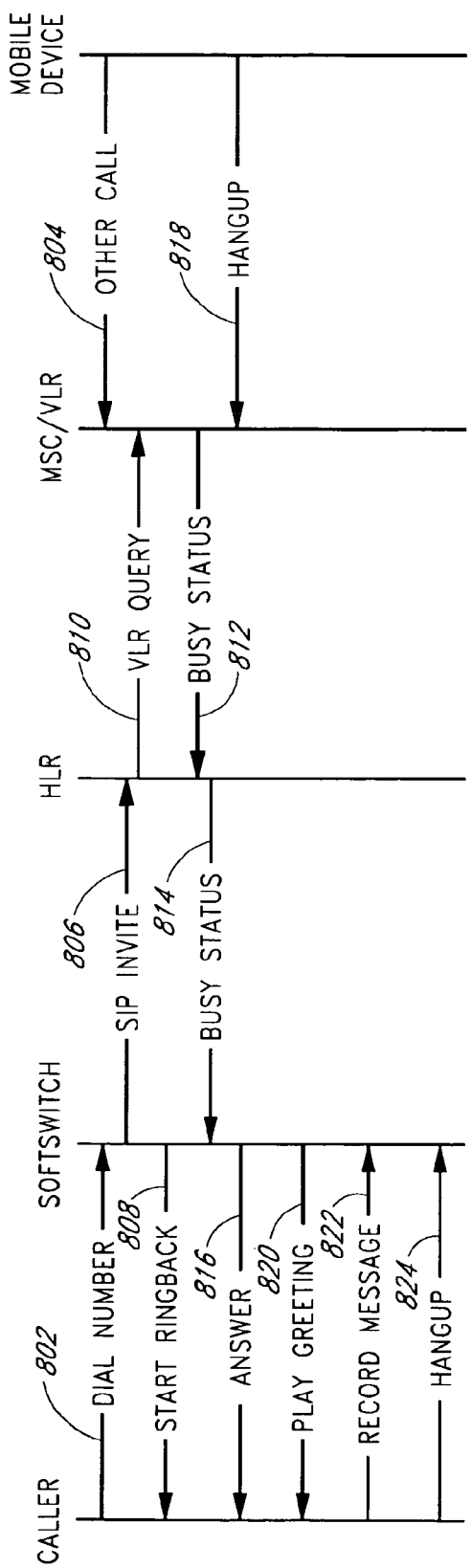
FIG. 8 illustrates an example call busy call handling process.

FIG. 8 illustrates an example call busy call handling process. If the HLR indicates that the mobile device is busy, a message is taken, as illustrated in FIG. 8. However, if Call Waiting is enabled, as is often the case for mobile devices, optionally an attempt is made to deliver the call per the scenario illustrated in FIG. 3, even though another call is in progress. With Call Waiting enabled there are relatively few boundary conditions in which the mobile device is considered "busy", (e.g., a call is being initiated from the mobile device or another call is presented while a call waiting condition is already in progress). In such "busy" conditions, the example call processing scenario illustrated in FIG. 8 is optionally performed.

Referring to FIG. 8, at state 802, a caller (via a caller telephonic device) dials a mobile access address associated with a subscriber's mobile device and the caller's call reaches a softswitch. At state 804, the mobile device is initiating a call (and hence is in a Busy state with respect to an incoming call). At state 806, the softswitch transmits a SIP invite to the HLR. At state 808, the softswitch initiates a ringback to the caller telephone. At state 810, the HLR transmits a VLR query to the MSC/VLR. At state 812, the VLR returns a Busy status to the HLR. At state 814, the HLR transmits the Busy status to the caller.

At state 816, the softswitch answers the inbound call from the caller. At state 818, the other call is terminated at the mobile device (e.g., the subscriber hangs up). At state 820, the softswitch plays a message to the caller asking the caller to leave a message. At state 822, the softswitch records a message from the caller for later retrieval by/transmission to the subscriber. At state 824, the caller hangs up and the caller's call is terminated.

Figure 9:
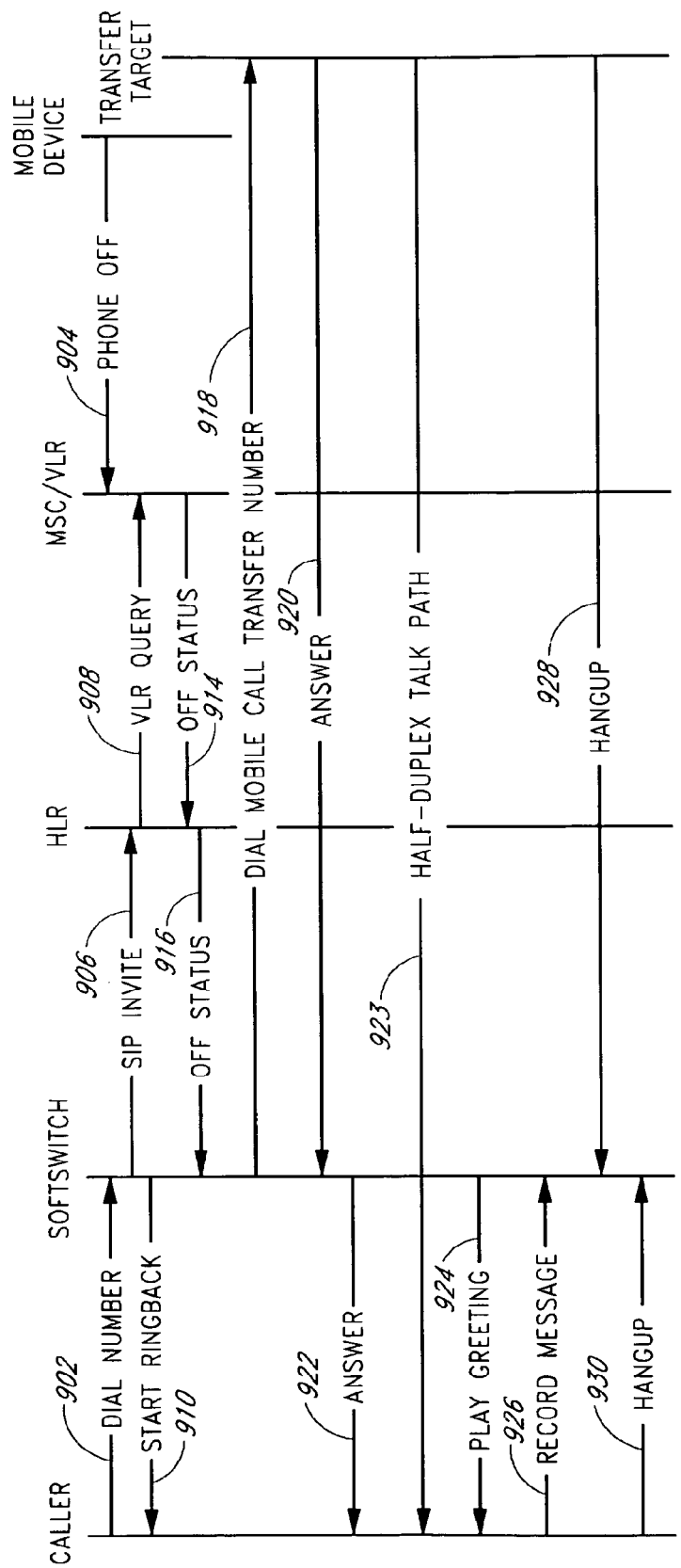
FIG. 9 illustrates an example call handling process where a called terminal is unavailable.

FIG. 9 illustrates an example call handling process where a called terminal is unavailable and call screening is enabled. For example, if the HLR indicates that the mobile device is Off, Out of Range, or otherwise unavailable, optionally an attempt is made to deliver the call to the configured mobile call transfer number (which can be another mobile device, a landline phone, a VoIP, or other destination). If the transfer fails, if it is not answered, or if no mobile call transfer number is configured, a message from the caller is recorded by the softswitch. The subscriber can then later access and playback the message. Optionally, an answer detection process is performed by the softswitch when placing an outcall that includes determining if a machine has answered the call (e.g., answering machine or voice mail), which is also optionally treated as a no answer condition.

Referring to FIG. 9, at state 902, a caller (via a caller telephonic device) dials a mobile access address associated with a subscriber's mobile device and the caller's call reaches a softswitch. At state 904, a determination is by the MSC/VLR that the mobile device is off (or unavailable). At state 906, the softswitch transmits a SIP invite to the HLR. At state 908, the HLR transmits a VLR query to the MSC/VLR. At state 910, the softswitch initiates a ringback to the caller telephone. At state 414, the MSC/VLR returns the Off status to the HLR. At state 916, the HLR returns the status of Off to the softswitch. At state 918, the softswitch "dials" the mobile call transfer number associated with the subscriber to place an outcall to the transfer target. At state 920, the transfer target associated with the transfer number is answered, and at state 922 the call between the caller and the softswitch is answered.

The inbound call and the outbound call are bridged. Because call screening is enabled, at state 923, a half duplex talk path is automatically established between the caller and the transfer target so that the subscriber can hear a message left by the caller, and the caller cannot hear the called party. At state 924, the softswitch plays a message to the caller asking the caller to leave a message. At state 926, the softswitch records a message from the caller. At state 928, the transfer target terminates the call (e.g., hangs up) between the transfer target and the softswitch. At state 930, the caller hangs up.

Figure 10:
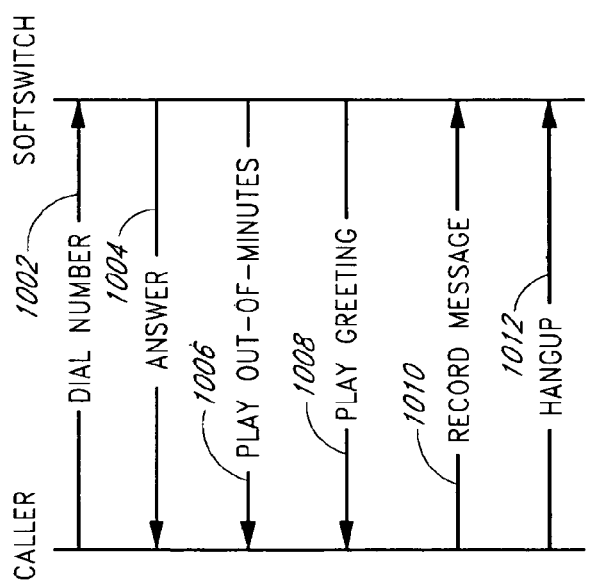
FIG. 10 illustrates another example call process wherein a call participant exhausts the participant's associated call minutes.

FIG. 10 illustrates another example call process wherein a call participant exhausts the participant's associated call minutes. If the subscriber has prepaid calling (e.g., where the subscriber has paid for a certain amount of call time, such as a certain number of minutes, prior to using the paid for call time), and there is less than a configurable predetermined amount of call time remaining in the account (e.g. one minute of call time), the caller is played a prompt informing them of the out-of-minutes condition or otherwise indicating that the call to the subscriber's terminal will not be completed, and a message is recorded as illustrated in FIG. 10.

At state 1002, the caller dials the phone number associated with the subscriber. At state 1004, the softswitch determines that an out of minutes condition is present (where the subscriber has less then a certain amount of prepaid call time remaining), and answers the call. At state 1006, the softswitch plays an "out of minutes" notification to the caller that indicates that the subscriber is out of call time or that indicates that the call to the subscriber's terminal cannot be completed (without giving a reason), and that indicates that the caller will be able to leave a message. At state 1008, the softswitch transmits a greeting to the caller asking the caller to leave a message. At state 1010, the message, if any, being left by the caller is recorded by the softswitch for later access by subscriber. At state 1012, the caller hangs up, and the call is terminated.

With respect to outcalls from the mobile device, when a phone call is placed via the mobile device, the caller ID field associated with that call is optionally populated with the subscriber's mobile access address. As similarly discussed above, in an example embodiment, outgoing calls do not route through the softswitch but optionally the MVNE does forward a call detail record to the softswitch for calls so that call time (e.g., minute) usage can be tracked.

If a subscriber has a prepaid account, the when prepaid call time (e.g., prepaid minutes) is exhausted, the softswitch optionally informs the MVNE HLR so that further outgoing call attempts from the mobile device get rejected (although certain call may still be allowed, such as calls placed to the softswitch or emergency calls to 911). Optionally, there is no announcement of remaining minutes by the softswitch when an outgoing call is initiated from the mobile device, but there is a call rejection announcement when the account is out of minutes. Optionally detecting minute depletion is performed while an outgoing call is in progress.

Figure 11:
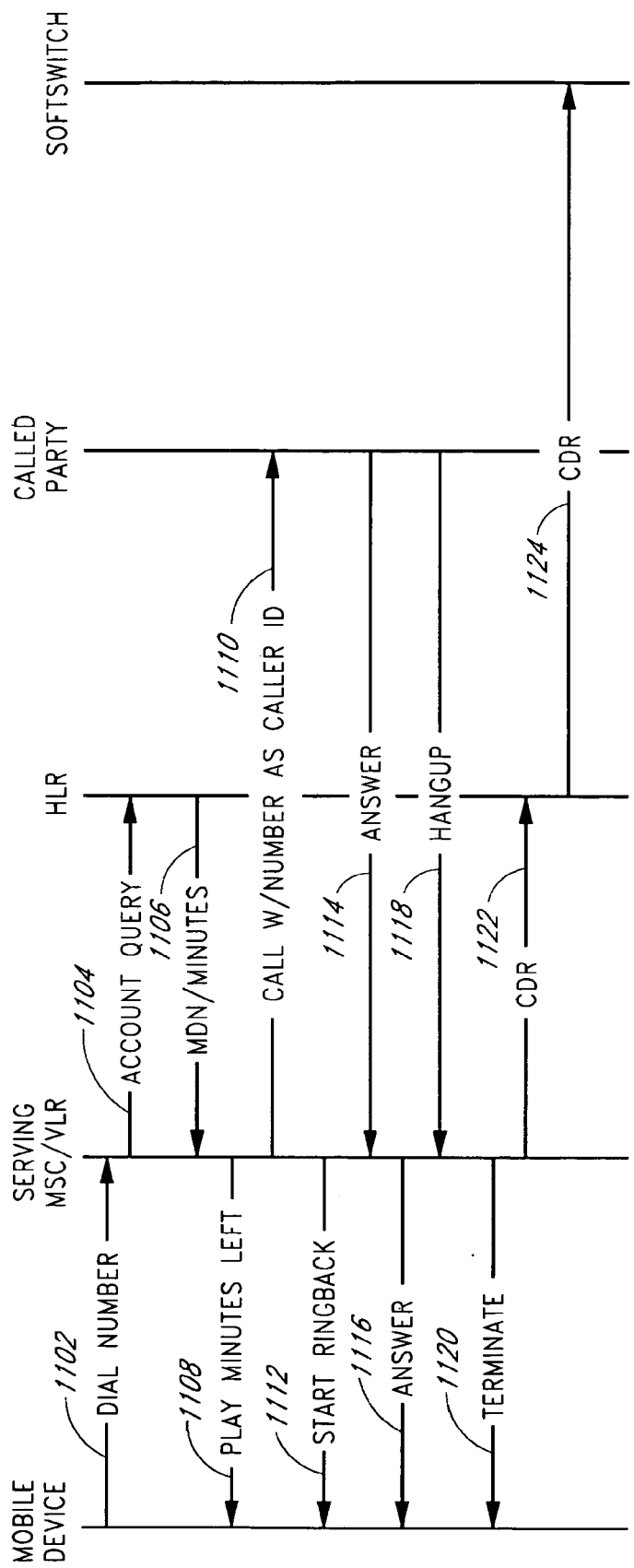
FIG. 11 illustrates an example call handling process where an outgoing call is placed from a prepaid phone terminal.

FIG. 11 illustrates an example call handling process where an outgoing call is placed from a prepaid phone terminal to a called party. At state 1102, the subscriber dials a called party phone number via the mobile device, which is received by the servicing MSC/VLR. At state 1104, the MSC/VLR transmits an account query to the HLR. At state 1106, the MVNE HLR transmits the remaining prepaid call time (e.g., the remaining minutes) to the MSC/VLR. At state 1108, the MSC/VLR informs the subscriber via the mobile device of the remaining call time.

At state 1110, the MSC/VLR provides the mobile access address in the call signaling caller ID field associated with the call to the called party. At state 1112, the MSC/VLR starts the ringback to the mobile device. At state 1114, the called party answers the call via the called party telephonic device. At state 1116, the MSC/VLR causes call completion between mobile device and the caller's telephonic device. At state 1118, the called party hangs up. At state 1120 the call connection to the mobile device is terminated. At state 1122, a call detail record (CDR) associated with the call is transmitted by the MSC/VLR to the HLR. At state 1122, the HLR sends the call detail record to the softswitch.

An outgoing call for a Postpaid or Flat Rate subscriber differs from the above process in that there is no minutes-left announcement.

Previously described are example methods of routing incoming calls to a mobile access address service. These calls route through the softswitch, with handling at least partly determined by feature settings and the current device status. Although an optional embodiment uses HLR integration, there may be situations in which HLR integration is not possible and/or desirable. In this case, features, such as Follow Me Home (wherein an incoming call is automatically transferred to a mobile call transfer number associated with the subscriber when the subscriber's mobile device is off or out-of-range) may optionally still be provided to the subscriber. For example, certain call handling features of the softswitch can be used to provide such functionality.

Figure 12:
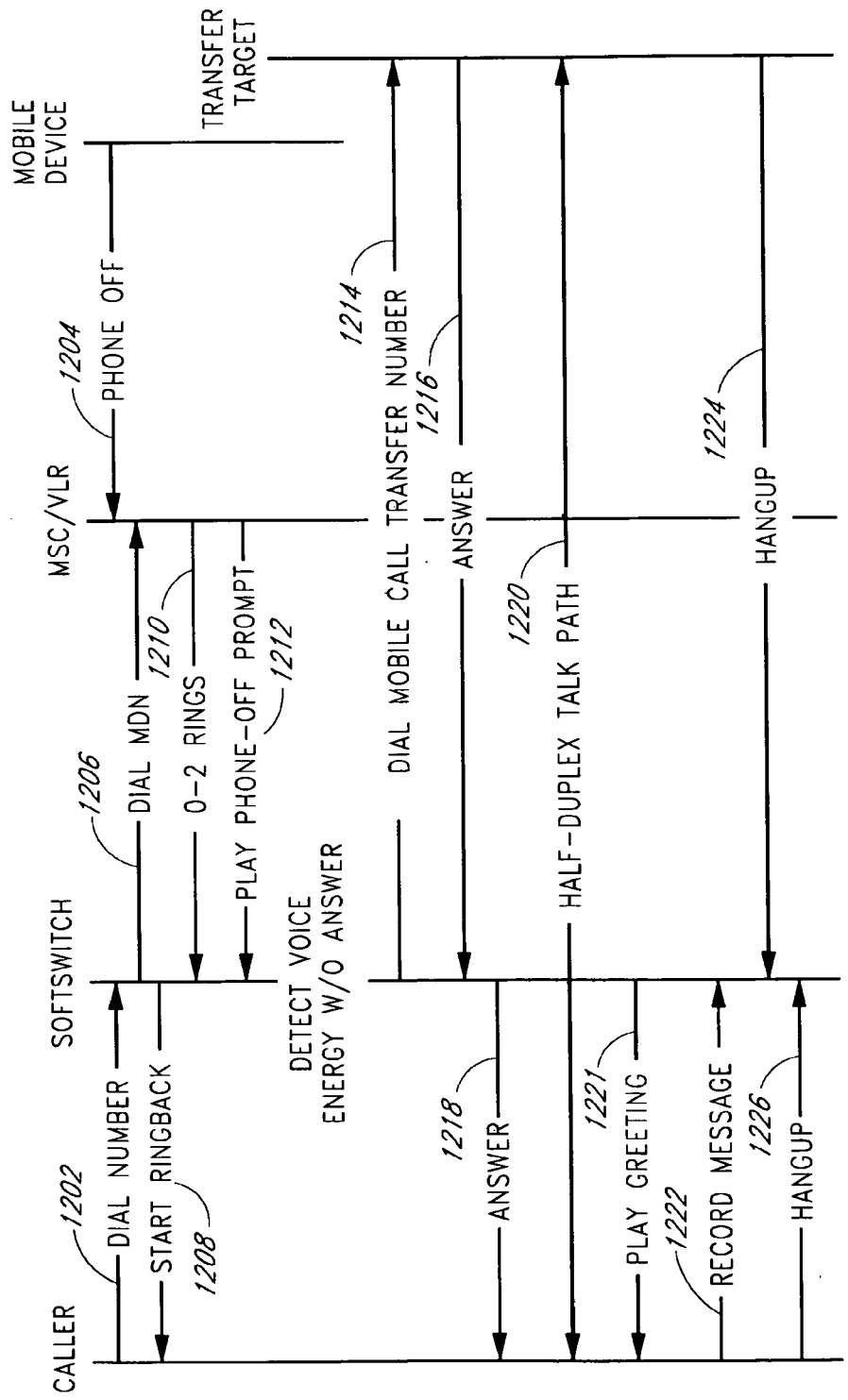
FIG. 12 illustrates another example call handling process where a called terminal is unavailable.

The example call scenario illustrated in FIG. 12 depicts status determination of a mobile device as being off/unavailable without HLR integration. This enables the softswitch to still deliver the call to the mobile call transfer number to provide Follow Me Home functionality. In this example, the mobile device has an assigned mobile access address, by which it is known to callers, and an internal Mobile Device Number (MDN), by which the softswitch connects to it in the wireless network. In this example, the mobile device is configured at the wireless carrier as having no forwarding and no voice mail service.

If the mobile device is off, after the softswitch dials the MDN, it may receive ringback from the MSC and then, without the MSC answering the call, the softswitch detects voice energy as a result of the MSC playing a phone-off prompt (normally to the caller but in this case, to the softswitch and not the caller since the softswitch has not yet connected this call leg to the caller). At this point, the softswitch knows that the mobile device is off or out-of-range, and so the softswitch dials a mobile call transfer number associated with an alternate phone of the subscriber to deliver the call to the alternate phone.

At state 1202, the caller dials the mobile access address. At state 1204, the MSC/VLR receives an indication that the subscriber's mobile device is off/unavailable. At state 1206, the softswitch dials the MDN associated with the mobile device. At state 1208, the softswitch begins the ringback to the caller telephonic device. At state 1210, a certain number of rings (e.g., 0-2) occur. At state 1212, the MSC/VLR provides an audible phone-off status prompt. The softswitch detects the voice energy associated with the prompt and the lack of a status of Answer from the MSC/VLR. At least partly in response, at state 1214, the softswitch dials the mobile call transfer number associated with a transfer target. At state 1216, the transfer target (e.g., another telephonic device) is answered. At state 1218, the call to the transfer target is bridged with the call from the caller. Because call screening is enabled, at state 1220, a half duplex talk path is automatically established between the caller and the transfer target so that the subscriber can hear a message left by the caller, and the caller cannot hear the called party.

At state 1221, the softswitch plays a message to the caller asking the caller to leave a message. At state 1222, the softswitch records a message from the caller. At state 1124, the transfer target hangs up, and at state 1226 the caller hangs up.

With respect to SMS messaging, as previously discuss, an SMS enabled mobile device can receive SMS messages originated from another mobile device. Such messages are optionally addressed directly to the device's mobile access address. A mobile device can also receive SMS messages that originate from the Internet. By way of example, such messages are addressed to <mobile access address>@<domain name>.<top level domain>. Incoming SMS messages (optionally, all SMS messages) for the mobile device route through the corresponding MVNE SMS Gateway. SMS messages (optionally, all SMS messages) originated from the mobile device optionally have the device's mobile access address as the sending address. The MVNE SMS Gateway handles routing for the outgoing SMS messages to other wireless carriers as needed.

For message accounting, the MVNE SMS Gateway optionally informs the softswitch or softswitch operator of each SMS message sent or received so that usage can be tracked for the account.

As discussed above, in certain situations, a caller may be prompted to record a message. Optionally, the prompt used is configured by the subscriber. For example, the subscriber may be provided with the option of selecting from the following prompt-types:

Standard System Greeting—generic system greeting prompt

Spoken Name Greeting—generic system greeting prompt with embedded name recorded by the subscriber Personal Greeting—prompt entirely recorded by the subscriber Optionally, the system prompts used when interacting with the caller can be in either a male or a female voice as configured by the subscriber.

If mobile call screening is enabled for a given call, the subscriber is able to listen to the caller while the message is being recorded. The subscriber can then interrupt the recording at a desired point to take the call. In this case, the message recorded up to that point is optionally stored and noted at the end as having ended because the call was taken.

When a message recording ends, a notification is sent to the locations configured/specified by the subscriber. The subscriber can optionally specify one or more of the notification mechanisms:

Email notification to a specified address, which defaults to the email address for the subscriber's account. The subscriber can also specify that the voice message is to be attached as a file to the email notification.

SMS message to the mobile device.

Voice message icon toggled on mobile device. This icon is toggled off (or other appropriate indication) when there are no un-reviewed messages.

A phone interface (e.g., an IVR) is optionally provided via the softswitch or other system for the subscriber to call in to review messages. The mobile device is optionally configured with a speed dial of 1 (or other designated user interface) for dialing the phone interface. The phone interface is also optionally accessible by directly dialing the mobile access address from the mobile device or from another phone. Optionally, access to recorded message (e.g., for playback to the subscriber) is provided upon entry of an account password associated with the subscriber account. If access is requested from the mobile device, optionally, the subscriber does not need to enter a password to review the recorded messages.

In an example embodiment, message review begins with a count of the number of new messages and then optionally immediately begins reviewing the first new message. Messages are reviewed in first-in-first out order, last-in-last-out order, via random access, or otherwise. After playing back a given message, the subscriber is given the option of deleting or saving the message. After the subscriber has reviewed new messages, the subscriber can elect to review saved messages.

Before, during, or after message review, the subscriber can elect to perform administrative functions, including some or all of the following:

Recording spoken name

Recording greeting

Setting Mobile Call Transfer Number

As similarly discussed above, a client application executing on a subscriber computer can be used to receive, edit, and display call log data from the softswitch (e.g., a list of calls placed to/received by the subscriber, or placed by the subscriber, including phone numbers, caller or called party names, date/time of the call, an indication as to whether a call was an outbound/inbound call, the city/state of the caller/called party, type of call (e.g., voice or fax), etc.), and call alert data (e.g., for an active call, listing the caller phone number, name, city/state, and/or call status (e.g., ringing, playing greeting, recording caller message, terminating call, forwarding call, conferencing call, displaying fax)). Optionally, when a call is received, the client application plays an audible signal, such as a ring tone. The client application can display a log of recorded messages from callers, and can provide playback controls (e.g., play, fast forward, rewind) for playing back or displaying the recorded message (e.g., a voice message, a video message, a fax message, etc.) via the client computer terminal. As previously discussed, the client optionally can also be used to screen calls (e.g., wherein the softswitch streams a message being left by a caller to the client so that the called party can listen to the message in substantially real time) and to instruct the softswitch to accept calls on the host computer terminal, forward calls, refuse calls, initiate call conferencing, and to otherwise provide call handling instructions.

For example, as similarly discussed above, when a call alert message is received by the client, as part of call presentation, a ringing sound is optionally played via the client host speakers. Optionally, the incoming call is displayed in a call alert user interface for a first amount of time (e.g., a set time, such as 5 seconds, or for a user configurable period of time), and then the call appears in the associated call log.

It should be understood that certain variations and modifications of this invention would suggest themselves to one of ordinary skill in the art. The scope of the present invention is not to be limited by the illustrations or the foregoing descriptions thereof.

What is claimed is:

1. A method of processing calls, the method comprising:

receiving over a network at a call processing system operated by a first service provider a first call from a caller directed to a first phone address of a user, wherein the user receives wireless service from a wireless provider, and wherein signaling information associated with the first call includes the phone address of the caller and the first service provider is different than the wireless provider of the user;

originating a second call from the call processing system to a mobile device of the user, wherein the mobile device accesses wireless service provided by the wireless provider of the user;

determining if the mobile device of the user is unavailable by detecting a voice prompt provided by the wireless provider of the user and without accessing a Home Location Register system of the user's wireless provider, wherein the caller does not hear the user unavailable voice prompt;

querying a call processing system database to determine an alternate phone address associated with the user;

originating a third call from the call processing system to the alternate phone address associated with the user, wherein signaling information associated with the third call includes an identifier associated with the caller so that the third call appears to be originating from the caller; and, bridging the first call with the third call.

2. The method as defined in claim 1, wherein the second and/or third call originates over a Voice over Internet Protocol (VoIP) network.

3. The method as defined in claim 1, wherein the third call from the call processing system is to a destination phone address which is not the same as the first phone address called by the caller in the first call.

4. The method as defined in claim 1, wherein the origination of the third call is a transfer of the second call.

5. The method as defined in claim 1, wherein the call information includes a designation as to whether the calling party's phone number is private.

6. The method as defined in claim 1, wherein the phone address destination of the third call is selected based at least in part on the geographic location of the user.

7. The method as defined in claim 1, wherein the caller hears a ringback tone selected by the user.

8. The method as defined in claim 1, wherein the caller is prompted to disclose caller identification information if their caller ID is blocked or restricted.

9. The method as defined in claim 1, further comprising automatically rejecting the first call if the first call is from a telemarketer.

10. The method as defined in claim 1, wherein the call processing system is a softswitch.

11. The method as defined in claim 1, the method further comprising providing an audible notification to the user via at least one telephonic device while the user is in communication with the calling party via the at least one telephonic device, wherein the audible notification is not transmitted to the calling party and the audible notification is related to call time.

12. A method of processing calls, the method comprising:
receiving over a network at a call processing system operated by a first service provider a first call from a caller directed to a first phone address of a user, wherein the user receives wireless service from a wireless provider, and wherein signaling information associated with the first call includes the phone address of the caller and the first service provider is different than the wireless provider of the user;
originating a second call from the call processing system to a mobile device number of the user, wherein the mobile device number is other than first phone address of the user;
determining if the mobile device of the user is unavailable by detecting a voice prompt provided by the wireless provider of the user and without accessing a Home Location Register system of the user's wireless provider, wherein the first call is not answered during a period in which the second call is originated and the mobile device is determined to be unavailable;
querying a call processing system database to determine an alternate phone address associated with the user; and,
connecting the caller to the alternate phone address associated with the user, wherein signaling information associated with the second call includes an identifier associated with the caller so that the second call appears to be originating from the caller.

13. The method as defined in claim 12, wherein connecting the caller to the alternate phone address associated with the user includes a call transfer.

14. The method as defined in claim 12, wherein the call information includes a designation as to whether the calling party's phone number is private.

15. The method as defined in claim 12, wherein the database query to determine an alternate phone address associated with the user is based at least in part on the geographic location of the user.

16. The method as defined in claim 12, wherein the caller hears a ringback tone selected by the user.

17. The method as defined in claim 12, wherein the caller is prompted to disclose caller identification information if their caller ID is blocked or restricted.

18. A system for processing calls, comprising:
one or more processing devices;
instructions stored in non-transitory computer readable memory that, when executed by the one or more processing devices, cause the system to perform operations comprising:
receiving over a network at the system operated by a first service provider a first call from a caller directed to a first phone address of a user, wherein the user receives wireless service from a wireless provider, and wherein signaling information associated with the first call includes the phone address of the caller and the first service provider is different than the wireless provider of the user;
originating a second call to a mobile device number of the user, wherein the mobile device number is other than first phone address of the user;
determining if the mobile device of the user is unavailable by detecting a voice prompt provided by the wireless provider of the user and without accessing a Home Location Register system of the user's wireless provider, wherein the first call is not answered during a period in which the second call is originated and the mobile device is determined to be unavailable;
querying a database to determine an alternate phone address associated with the user; and,
connecting the caller to the alternate phone address associated with the user, wherein signaling information associated with the second call includes an identifier associated with the caller so that the second call appears to be originating from the caller.

19. The system as defined in claim 18, wherein the system is connecting the caller to the alternate phone address associated with the user by invoking a call transfer.

20. The system as defined in claim 18, wherein the database query to determine an alternate phone address associated with the user is based at least in part on the geographic location of the user.

* * * * *